US006445963B1

(12) United States Patent
Blevins et al.

(10) Patent No.: US 6,445,963 B1
(45) Date of Patent: Sep. 3, 2002

(54) INTEGRATED ADVANCED CONTROL BLOCKS IN PROCESS CONTROL SYSTEMS

(75) Inventors: Terrence L. Blevins; Wilhelm K. Wojsznis, both of Round Rock; Vasiliki Tzovla; Dirk Thiele, both of Austin, all of TX (US)

(73) Assignee: Fisher Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/412,078

(22) Filed: Oct. 4, 1999

(51) Int. Cl.$^7$ ............................................... G05B 13/02
(52) U.S. Cl. ............................. 700/44; 700/19; 700/28; 700/29; 700/31; 700/45; 700/53; 703/13; 703/14; 703/15; 706/5; 706/14; 706/21; 706/920
(58) Field of Search .................................. 700/7, 11, 19, 700/23, 28, 29–31, 34, 41–46, 48–54, 67, 73–74; 703/13, 14, 15; 706/5, 14–15, 920, 21–23

(56) References Cited

U.S. PATENT DOCUMENTS

| 5,301,101 A | 4/1994 | MacArthur et al. ......... 364/156 |
| 5,347,446 A | 9/1994 | Iino et al. .................... 364/149 |
| 5,353,207 A | 10/1994 | Keeler et al. ............... 364/164 |

(List continued on next page.)

FOREIGN PATENT DOCUMENTS

| EP | 0 524 317 A1 | 1/1993 |
| EP | 0 588 594 A2 | 3/1994 |

OTHER PUBLICATIONS

Search Report issued by UK Patent Office for Patent Application No. GB 0024094.5 dated Feb. 14, 2001.
Hoffman et al., "Model Predictive Control: Future Requirements and Trends," ISA, 1993, Paper #93–369, pp. 1241–1247 (Oct. 1993).
Froisy, "Model Predictive Control: Past, Present and Future," 33 *ISA Transactions* pp. 235–243 (1994).
McMillan, "Process Control Optimization," slides entitled "Breaking Into Model Based Control" presented at *Fisher–Rosemount Systems Advanced Control Seminar*, San Antonio (Nov. 1997).
Qin et al., "An Overview of Industrial Model Predictive Control Technology," AIChE Conference, pp. 1–31 (1996).
Edgar et al., "Optimization of Chemical Processes," Chapter 7, McGraw–Hill, Inc., pp. 251–298 (1988).

(List continued on next page.)

*Primary Examiner*—Ramesh Patel
(74) *Attorney, Agent, or Firm*—Marshall, Gerstein, & Borun.

(57) ABSTRACT

An advanced control block that implements multiple-input/multiple-output control, such as model predictive control, within a process control system is initiated by creating an initial control block having generic control logic and desired control inputs and control outputs communicatively connected to process outputs and process inputs within a process control routine. A waveform generator within the control block systematically upsets each of the process inputs via the control block outputs using excitation waveforms designed for use in developing a process model. At the same time, a data collection routine collects data indicating the response of each of the process outputs to the waveforms delivered at each of the process inputs. After sufficient data has been collected, a process modeling routine generates a process model from the collected data and a control logic parameter creation routine creates control logic parameters for the control logic from the process model. The control logic parameters and the process model are then downloaded to the control block to complete formation of the advanced control block. Thereafter, the advanced control block is used to provide advanced process control within the process control routine. Likewise, the process model is used to provide simulation of the process or to produce virtual process outputs.

60 Claims, 10 Drawing Sheets

U.S. PATENT DOCUMENTS

| | | | |
|---|---|---|---|
| 5,384,698 A | | 1/1995 | Jelinek .................. 364/149 |
| 5,453,925 A | * | 9/1995 | Wojsznis et al. ............ 318/561 |
| 5,457,625 A | | 10/1995 | Lin et al. .................... 364/149 |
| 5,517,424 A | | 5/1996 | Marcelle et al. ............ 364/494 |
| 5,559,690 A | | 9/1996 | Keeler et al. ................ 364/164 |
| 5,568,378 A | * | 10/1996 | Wojsznis .................... 700/44 |
| 5,587,899 A | * | 12/1996 | Ho et al. .................... 700/37 |
| 5,594,858 A | | 1/1997 | Blevins ...................... 395/326 |
| 5,659,467 A | | 8/1997 | Vickers ...................... 364/138 |
| 5,659,667 A | | 8/1997 | Buescher et al. ........... 395/239 |
| 5,682,309 A | | 10/1997 | Bartusiak et al. ........... 364/149 |
| 5,704,011 A | | 12/1997 | Hansen et al. ................ 395/22 |
| 5,740,033 A | | 4/1998 | Wassick et al. ............. 364/149 |
| 5,748,467 A | * | 5/1998 | Qin et al. .................... 700/41 |
| 5,781,432 A | | 7/1998 | Keeler et al. ................ 364/164 |
| 5,825,646 A | | 10/1998 | Keeler et al. ................ 364/164 |
| 5,838,563 A | | 11/1998 | Dove et al. .................. 364/188 |
| 5,841,652 A | | 11/1998 | Sanchez ...................... 364/164 |
| 5,859,773 A | | 1/1999 | Keeler et al. ................ 364/164 |
| 5,920,478 A | | 7/1999 | Ekblad et al. ............... 364/149 |
| 6,215,907 B1 | * | 4/2001 | Kumar et al. ................ 382/240 |
| 6,298,454 B1 | * | 10/2001 | Schleiss et al. ................ 714/37 |

OTHER PUBLICATIONS

Wilhelm et al., "Advanced Process Control In Record Time," Control Magazine Software and Information Systems (May 1999).

Provisional Application No. 60/132,780, dated May 6, 1999, "Integrating Distributed Process Control System Functionality on a Single Computer."

* cited by examiner

INTEGRATED ADVANCED CONTROL BLOCKS IN PROCESS CONTROL SYSTEMS

FIELD OF THE INVENTION

The present invention relates generally to process control systems and, more particularly, to the use of advanced control blocks, such as model predictive and neural network control blocks, in process control systems.

DESCRIPTION OF THE RELATED ART

Process control systems, such as distributed or scalable process control systems like those used in chemical, petroleum or other processes, typically include one or more process controllers communicatively coupled each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process, such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®, Device-Net®, and CAN protocols, have been developed to enable smart field devices made by different manufacturers to be used together within the same process control network.

Moreover, there has been a move within the process control industry to decentralize process control functions. For example, the all-digital, two-wire bus protocol promulgated by the Fieldbus Foundation, known as the FOUNDATION® Fieldbus (hereinafter "Fieldbus") protocol uses function blocks located in different field devices to perform control operations previously performed within a centralized controller. In particular, each Fieldbus field device is capable of including and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-derivative-integral (PID) control routine. The different function blocks within a process control system are configured to communicate with each other (e.g., over a bus) to form one or more process control loops, the individual operations of which are spread throughout the process and are, thus, decentralized.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single output used to control a single process input, such as a valve position, etc. However, in certain cases, the use of a number of independently operating, single-input/single-output control loops is not very effective because the process variables being controlled are effected by more than a single process input and, in fact, each process input may effect the state of many process outputs. An example of this might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which; for example, causes the pressure loop to open the outlet valve to decrease the pressure. This action may then cause the throughput control loop to close one of the input valves, thereby effecting the temperature and causing the temperature control loop to take some other action. As will be understood in this example, the single-input/single-output control loops cause the process outputs (in this case, throughput, temperature and pressure) to oscillate without ever reaching a steady state condition, which is undesirable.

Model predictive control or other types of advanced control have been used in the past to perform control in these types of situations. Generally speaking, model predictive control is a multiple-input/multiple output control strategy in which the effects of changing each of a number of process inputs on each of a number of process outputs is measured and these measured responses are then used to create a model of the process. The model of the process is inverted mathematically and is then used as a multiple-input/multiple-output controller to control the process outputs based on changes made to the process inputs. In some cases, the process model includes a process output response curve for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. However, model predictive control is described generally in Qin, S. Joe and Thomas A. Badgwell, "An Overview of Industrial Model Predictive Control Technology," AIChE Conference, 1996.

In the past, creating a model predictive controller and placing that controller in a process control network required a significant amount of time and effort and could be extremely expensive. Usually, to create a model predictive controller for a particular process, a process expert (typically an out-side consultant) was employed to come to the plant and observe the plant or process operation. After choosing the appropriate process inputs and outputs for the model predictive controller, the expert sat in the control room and instructed the operator to deliver a series of stepped input waveforms to each of the chosen process inputs and to measure the effect of each of these inputs on each of the chosen process outputs. After collecting all of the process data, the expert generally delivered the collected data to an off-line system. There, the expert ran a first routine to screen the collected data for the purpose of eliminating bad data, such as data collected when the process was not operating normally, was shut down or in which some other error was present which prevented the collected data from representing normal operation of the process. The off-line system then ran a second routine using the screened data to create a model of the process. Thereafter, the model of the process was inverted or used in other known manners to create a model predictive controller for the process. Once the model predictive controller was created, it then had to be inserted into the process control system which generally meant that a process engineer had to program the control routines already within the control system to deliver each of the specified controller inputs (i.e., process outputs) to the model predictive controller and to have the model predictive controller deliver each of the controller outputs (i.e., process inputs) to the appropriate place in the control system to perform control. Although some venders used the same names for the model predictive controller inputs and outputs as used in the process control routine or system, in some cases, it was necessary to match up the inputs and outputs of the model predictive controller to the process outputs and inputs, as defined within the process control system. In any event, the step of incorporating a model predictive controller into a process control system could require a great deal of programming effort.

Consequently, although generally known in the art, the creation of the process model from the collected data, the creation of the model predictive controller and the incorporation of this controller into a process is time consuming, generally requires the input of an expert and can be very expensive. In fact, it can take several months and cost hundreds of thousands of dollars to create a single model predictive controller for a process. Unfortunately for the process operator, changes in the process, such as those caused by aging of the process equipment, can force the created model predictive controller to be obsolete or mismatched to the process, which means that the whole process has to be performed again to create another model predictive controller.

Still further, because the model predictive controller was typically created by an off-line system, this controller was generally not integrated into the process control system in the same manner as single loop or other control routines executed by the control system and, therefore, required special graphics to be created for the user or operator to view the state and operation of the model predictive controller. For this reason, it was hard to incorporate model predictive controllers into process control systems, such as the DeltaV™ control system sold by Fisher Rosemount Systems, Inc., which have a process control display mechanism integrated with the operation of control blocks or control loops within the controller. In fact, the DeltaV system provides different views, such as an engineer's view, an operator's view and the like which display operation of the process to a user. Once set up, these views are automatically updated by the operation of function blocks executed within, for example, the process controller. However, to add a view or other information screen for a model predictive controller designed off-line by a different system, special graphics displays had to be created, typically in a different format than that used by the DeltaV system.

While these problems exist for model predictive controllers, the same or similar problems exist in the development and use of other advanced multipleinput/multiple output control blocks or systems, such as neural network modeling or control systems, multi-variable fuzzy logic controllers, real time optimizers, etc.

SUMMARY OF THE INVENTION

According to one aspect of the invention, an advanced control block implements multiple-input/multiple-output control, such as model predictive control, neural network modeling or control, etc., within a process control system in a manner that is integrated with the control blocks implemented using a control paradigm, such as the Fieldbus paradigm. The advanced control block may be initiated by creating a control block having desired inputs and outputs to be connected to process outputs and inputs, respectively, for controlling a process. The control block may be intended to ultimately include, for example, a complete model predictive controller, but initially has a data collection routine and a waveform generator associated therewith. If desired, the control block may have control logic that is untuned or otherwise undeveloped because this logic is missing tuning parameters, matrix coefficients or other control parameters necessary to be implemented. The control block is placed within the process control system with the defined inputs and outputs communicatively coupled within the control system in the manner these inputs and outputs would be connected if the advanced control block was being used to control the process. During a test procedure, the control block systematically upsets each of the process inputs via the control block outputs using waveforms generated by the waveform generator specifically designed for use in developing a process model. Then, via the control block inputs, the control block coordinates the collection of data pertaining to the response of each of the process outputs to each of the generated waveforms delivered to each of the process inputs. This data may, for example, be sent to a data historian to be stored.

After sufficient data has been collected, a process modeling procedure is run in which a process model is generated from the collected data using, for example, a model predictive controller process model generation routine. Thereafter, an advanced control block logic parameter determination routine is used to create or developed the parameters needed by the control logic to be used to control the process. The control logic parameters and, if needed, the process model, are then downloaded to the control block to complete formation of the advanced control block so that the advanced control block, with the advanced control logic parameters and process model therein, can be used to control the process.

The advanced control block can be designed in the same format or according to the same programming paradigm as other control blocks within the process control system and, therefore, can support the same graphical views supported by the other blocks (or elements) within the process control routine. Thus, the advanced control block may have one or more graphical views to be displayed to one or more users and may send data to these views during operation of the advanced control block.

Furthermore, the process model generated by the process modeling procedure may be used to simulate operation of the process and/or to simulate interaction of the process and the advanced control block. In one case, a process simulation block may be created from the determined process model and this process simulation block may be communicatively connected to the created advanced control block to test the operation of the advanced control block before using the advanced control block to control the actual process. In another case, a process simulation block may be created using an altered version of the determined process model to reflect aging or other changes within the process. This simulation block may be communicatively connected to the advanced control block to simulate operation of the advanced control block in the presence of changes to the process to thereby determine the performance of the advanced control block in the presence of process model mismatch. In a still further case, a simulation block developed from the process model may be run in conjunction with the process and may be used to create virtual process outputs to be used as inputs for the advanced control block when, for example, a sensor measuring one of the actual process outputs fails. The simulated process outputs may also be compared to the actual process outputs to determine the amount of mismatch between the process and the process model used to create the advanced control block, i.e., the process/process-model mismatch.

DESCRIPTION OF THE PREFERRED EMBODIMENTS

Figure 1:
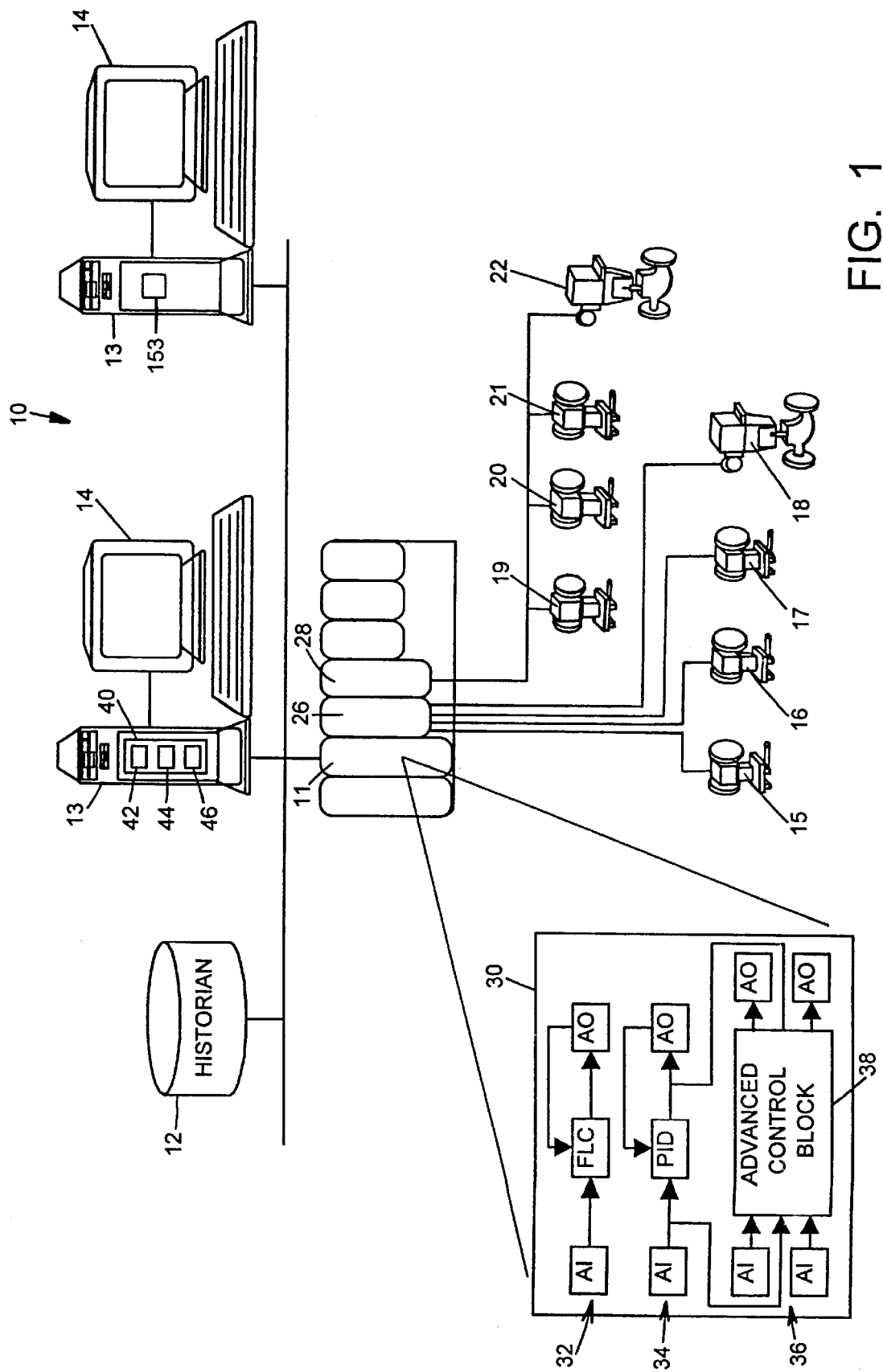
FIG. 1 is a block/schematic diagram of a process control system in which an advanced control block can be created and used.

Referring now to FIG. 1, a process control system 10 includes a process controller 11 connected to a data historian 12 and to one or more host workstations or computers 13 (which may be any type of personal computers, workstations, etc.), each having a display screen 14. The controller 11 is also connected to field devices 15–22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the DeltaV™ controller sold by Fisher-Rosemount Systems, Inc., is communicatively connected to the host computers 13 and the data historian 12 via, for example, an ethernet connection or any other desired communication network. The controller 11 is also communicatively connected to the field devices 15–22 using any desired hardware and software associated with, for example, standard 4–20 ma devices and/or any smart communication protocol such as the Fieldbus protocol, the HART protocol, etc.

The field devices 15–22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15–18 are standard 4–20 ma devices that communicate over analog lines to the I/O card 26 while the field devices 19–22 are smart devices, such as Fieldbus field devices, that communicate over a digital bus to the I/O card 28 using Fieldbus protocol communications. Generally speaking, the Fieldbus protocol is an all-digital, serial, two-way communication protocol that provides a standardized physical interface to a two-wire loop or bus which interconnects field devices. The Fieldbus protocol provides, in effect, a local area network for field devices within a process, which enables these field devices to perform process control functions (using function blocks defined according to the Fieldbus protocol) at locations distributed throughout a process facility and to communicate with one another before and after the performance of these process control functions to implement an overall control strategy. It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein. Of course, the field devices 15–22 could conform to any other desired standard (s) or protocols, including any standards or protocols developed in the future.

The controller 11 implements or oversees one or more process control routines, which may include control loops, stored therein or otherwise associated therewith and communicates with the devices 15–22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this invention, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

In one embodiment, the controller 11 implements a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4–20 ma devices and some types of smart field devices such as HART devices, or may be stored in and implemented by the field devices themselves, which can be the case with Fieldbus devices. While the description of the control system is provided herein using a function block control strategy, the control strategy or control loops or modules could also be implemented or designed using other conventions, such as ladder logic, sequential function charts, etc. or using any other desired programming language or paradigm.

As illustrated by the exploded block 30 of FIG. 1, the controller 11 may include a number of single-loop control routines, illustrated as routines 32 and 34, and, if desired, may implement one or more advanced control loops, illustrated as control loop 36. Each such loop is typically referred to as a control module. The single-loop control routines 32 and 34 are illustrated as performing signal loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36. is illustrated as including an advanced control block 38 having inputs communicatively connected to numerous AI function blocks and outputs communicatively connected to numerous AO function blocks, although the inputs and outputs of the advanced control block 38 may be connected to any other desired function blocks or control elements to receive other types of inputs and to provide other types of control outputs. The advanced control block 38 may be any type of multiple-input/multiple-output control block used to control two or more process outputs by providing control signals to two or more process inputs. While the advanced control block 38 will be described herein as being a model predictive control (MPC) block, the advanced control block 38 could be any other multiple-input/multiple-output block, such as a neural network modeling or control block, a multi-variable fuzzy logic control block, a real-time-optimizer block, etc. It will be understood that the function blocks illustrated in FIG. 1, including the advanced control block 38, can be executed by the controller 11 or, alternatively, can be located in and executed by any other processing device, such as one of the workstations 13 or even one of the field devices 19–22.

As illustrated in FIG. 1, one of the workstations 13 includes an advanced control block generation routine 40 that is used to create, download and implement the advanced control block 38 in a manner described in more detail herein. While the advanced control block generation routine 40 may be stored in a memory within the workstation 13 and executed by a processor therein, this routine (or any part thereof) may additionally or alternatively be stored in and executed by any other device within the process control system 10, if so desired. Generally speaking, the advanced control block generation routine 40 includes a control block creation routine 42 that creates an advanced control block and that connects this advanced control block into the process control system, a process modeling routine 44 that creates a process model for the process or a portion thereof based on data collected by the advanced control block, and a control logic parameter creation routine 46 that creates control logic parameters for the advanced control block from the process model and that stores or downloads these control logic parameters in the advanced control block for use in controlling the process. It will be understood the routines 42, 44 and 46 can be made up of a series of different routines, such as a first routine that creates an advanced control element having control inputs adapted to receive process outputs and. having control outputs adapted to provide control signals to process inputs, a second routine that enables a user to communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that creates a process model from the collected data, a sixth routine that develops advanced control logic parameters from the process model and a seventh routine that places the advanced control logic and, if needed, the process model within the advanced control element to enable the advanced control element to control the process.

Figure 2:
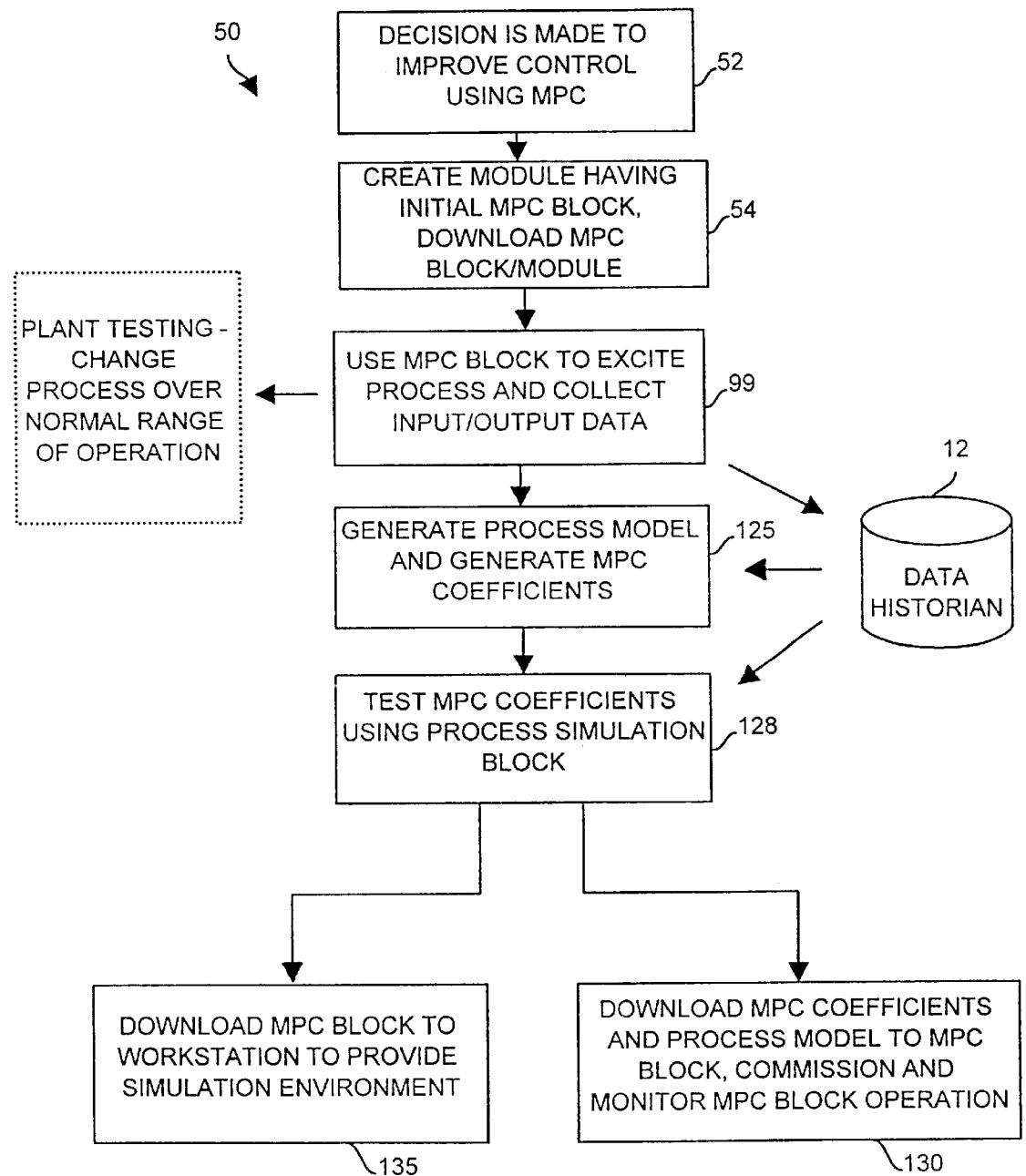
FIG. 2 is a flow diagram illustrating the operation and creation of an advanced control block within the process control system of FIG. 1.

Referring now to FIG. 2, a flowchart 50 illustrates the steps of creating and using an advanced control block and, in particular, an MPC control block, within a process control system such as the process control system 10. of FIG. 1. While the flowchart 50 of FIG. 2 illustrates the creation of an MPC block or module, the same or similar steps could be performed to create and use any other advanced control block such as any multiple-input/multiple-output control block like a neural network modeling or control block, a multi-variable fuzzy logic control block, etc.

First, at some time 52, a decision is made to improve or provide control within the process control system 10 by implementing an MPC procedure. This decision may be made at the time the process control system 10 is first set up or at some later time after, for example, other control routines, such as single-loop control routines, have been found to provide inadequate control. At the time 52, an operator or other user executes the MPC block generation routine 40 to begin the steps of creating an MPC module or control loop within the process control system. As part of this process, the operator chooses the process inputs to which the outputs of the MPC block being designed are to be connected and chooses the process outputs to which the inputs of the MPC block being designed are to be connected. While the MPC block may have any number of inputs and outputs, each MPC block generally has three kinds of inputs including controlled parameter inputs which are the process variables or parameters that are to be maintained at a set point (or within a set range) constrained inputs which are the process variables that are constrained to a particular limit or range based on, for example, physical limitations associated with the process and which the MPC block must not force to be outside of the constrained range or limit, and process disturbance parameter inputs, which are other process variables, such as process inputs that, when altered, are known to cause changes to the controlled parameters. The MPC block uses the process disturbance parameter inputs to foresee changes to the controlled parameters (i.e., the controlled process outputs) and to limit the effects of these changes before they occur. Other inputs may also be provided to the MPC block, such as feedback from a device or other process element being controlled which enables the MPC control block to provide more effective control of these elements. Similarly, the outputs of the MPC block may be connected to control any desired process variable or other process input including control loop inputs, device control inputs, etc. The routine developed by connecting the MPC block to other control elements is referred to herein as an MPC module. While the user may create an MPC function block, the user may also obtain an initial function block from a memory, such as a library of function blocks, and use this function block or create an instance of this function block for use in the process control system. Likewise, a user or other provider may provide a function block or other control element in any other desired manner.

At a step 54, the operator creates an MPC module having an MPC block (which does not yet have all of the information needed to provide model predictive control) with the specified inputs and outputs communicatively connected within the process control system and downloads the block or module to the appropriate controller or other device that will implement the MPC module. As part of this process, the operator configures the process control system 10 to implement the MPC block by communicatively coupling the outputs of the MPC block to the appropriate process inputs and by communicatively coupling the inputs of the MPC block to the appropriate process ohutputs.

Figure 3:
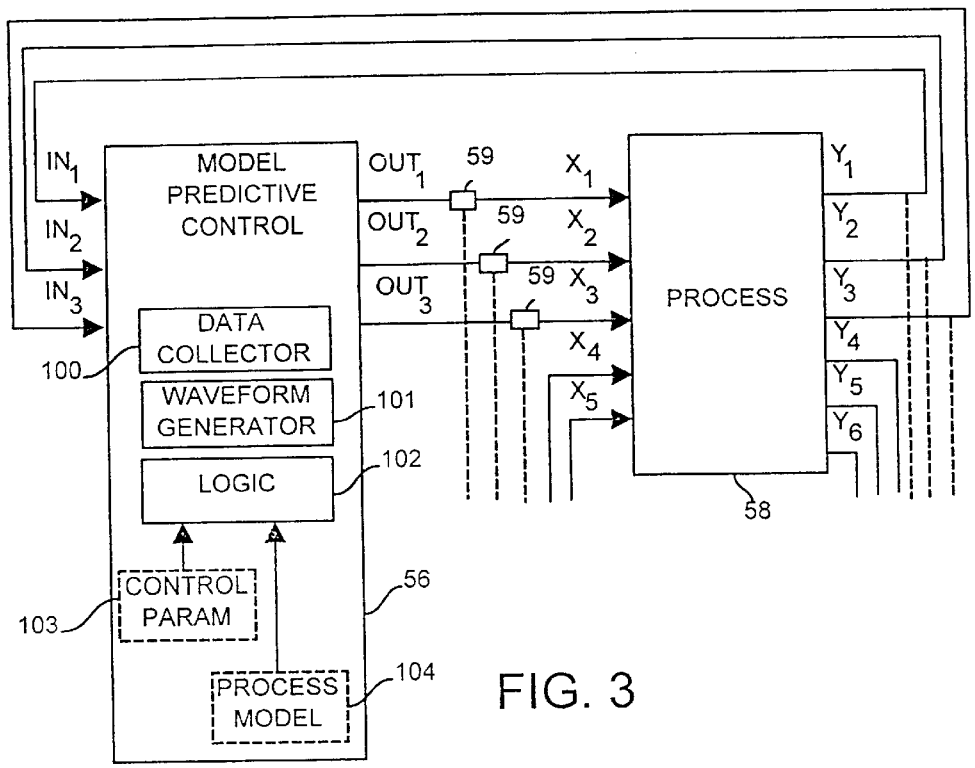
FIG. 3 is a block diagram of a model predictive control block connected within a process control routine to control a process.

Referring to FIG. 3, an MPC block 56 is illustrated as being connected to a process 58. The MPC block 56 is a 3×3 control block having three inputs $IN_1$–$IN_3$ and three outputs $OUT_1$–$OUT_3$ while the process 58 includes inputs $X_1$–$X_5$ and outputs $Y_1$–$Y_6$. Of course, the MPC block 56 and the process 58 could include any other numbers of inputs and outputs. While the MPC block 56 may generally be a square block, i.e., having the same number of inputs as outputs, this configuration is not necessary and the MPC block 56 may have different numbers of inputs and outputs. As illustrated in FIG. 3, the operator communicatively connects the process outputs $Y_1$–$Y_3$ to the MPC block inputs $IN_1$–$IN_3$, respectively, and communicatively connects the MPC block outputs $OUT_1$–$OUT_3$ to the process inputs $X_1$–$X_3$, respectively. Of course, any of the inputs and outputs of the process 58 may be connected to other control loops or to other elements within other control routines associated with the process control system 10 (as indicated by dotted lines connected to the process inputs and outputs in FIG. 3). Generally speaking, the MPC block 56 and the other blocks which may be providing control inputs to the process 58 (as illustrated by dotted lines connected to the process inputs $X_1$–$X_3$) will be connected through a switch of some sort, these switches being illustrated by the boxes 59 in FIG. 3. The switches 59 may be hardware or software switches and, if desired may be provided by having the different control input signals delivered to different inputs of a function block, such as a Fieldbus function block, which can then select between the control signal from the MPC block 56 and a control signal from a different function block, such as from a PID function block, based on the mode of the function block receiving the two signals.

Of course, the operator can connect the MPC block 56 to the process 58 in any desired manner and, generally speaking, will use the same control configuration or design program that the operator uses to create other control loops like single-loop control routines within the process control system 10. For example, the operator may use any desired graphical programming routine to specify the connections between the MPC block 56 and the process inputs and outputs. In this manner, the MPC block 56 is supported in the same way as other control blocks, elements or routines, which makes configuration and connection of the MPC block 56 and support of that block within the control system 10 no different than the configuration, connection and support of the other blocks within the system. In one embodiment, the MPC block 56, as well as the other blocks within the control system 10, are function blocks designed to be the same as or similar to Fieldbus function blocks. In this embodiment, the MPC block 56 may have the same or similar types of inputs, outputs, etc. as specified or provided in the Fieldbus protocol and is capable of being implemented by, for example, the controller 11 using communication links which are the same as or similar to those specified by the Fieldbus protocol. A method of graphically creating process control routines and elements thereof is described in Dove et al., U.S. Pat. No. 5,838,563 entitled "System for Configuring a Process Control Environment" which is hereby expressly incorporated by reference herein. Of course, other control loop or control module design strategies could be used as well, including those which use other types of function blocks or which use other routines, sub-routines or control elements within a process control configuration paradigm.

When using a control system based on the interconnection of function blocks, such as those provided by the Fieldbus function block paradigm, the MPC block 56 can be connected directly to other function blocks within the process control routine. For example, the MPC block 56 may be connected to control devices, such as valves, etc. directly by connecting a control output of the MPC block 56 to an output block (such as an AO block) associated with the device being controlled. Likewise, the MPC block 56 may provide control signals to function blocks within other control loops, such as to the input of other control function blocks, to oversee or override the operation of these control loops.

Figure 4A:
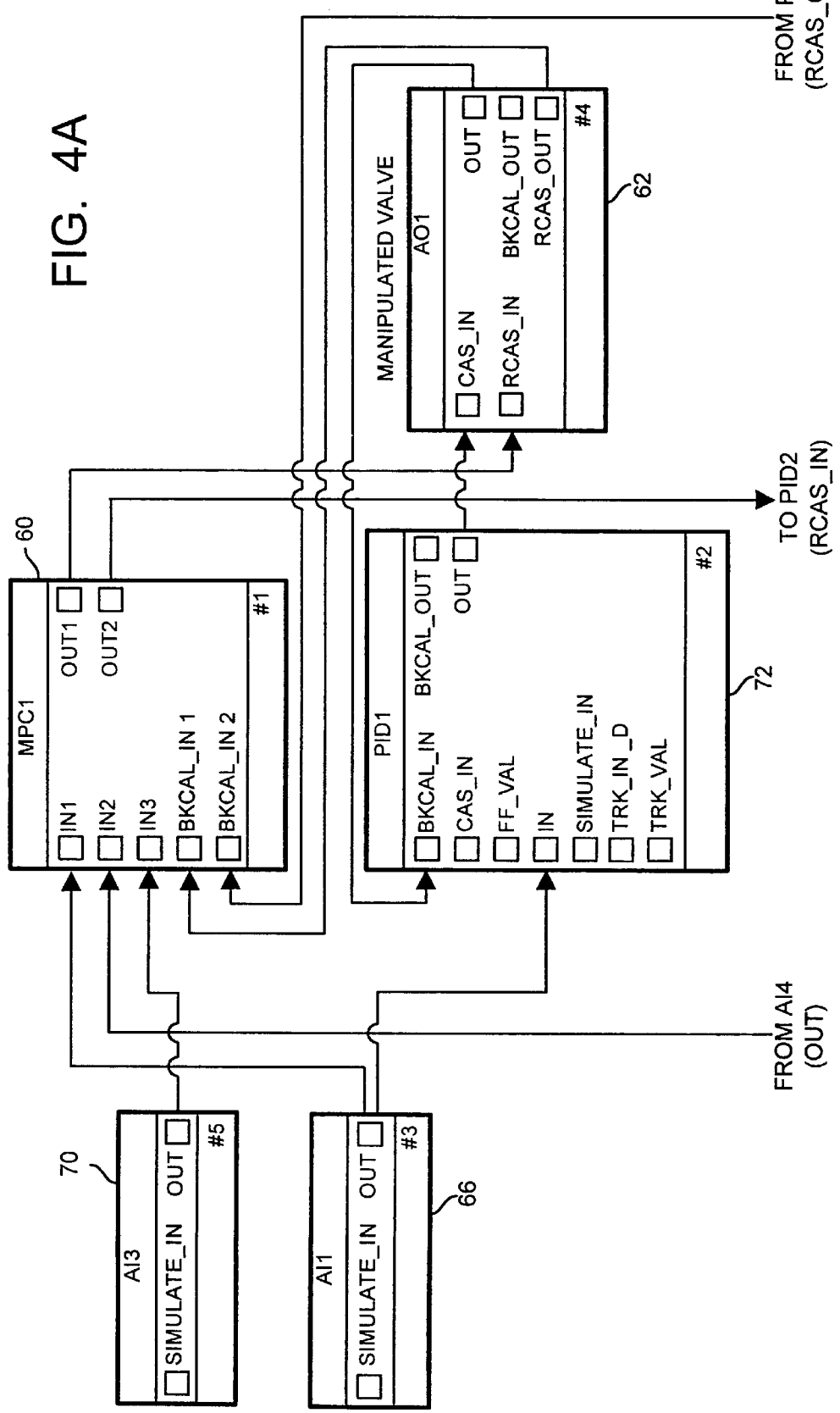
FIGS. 4A and 4B are a block diagram of a model predictive control function block connected to function blocks within a process control routine to coordinate an existing control strategy.
Figure 4B:
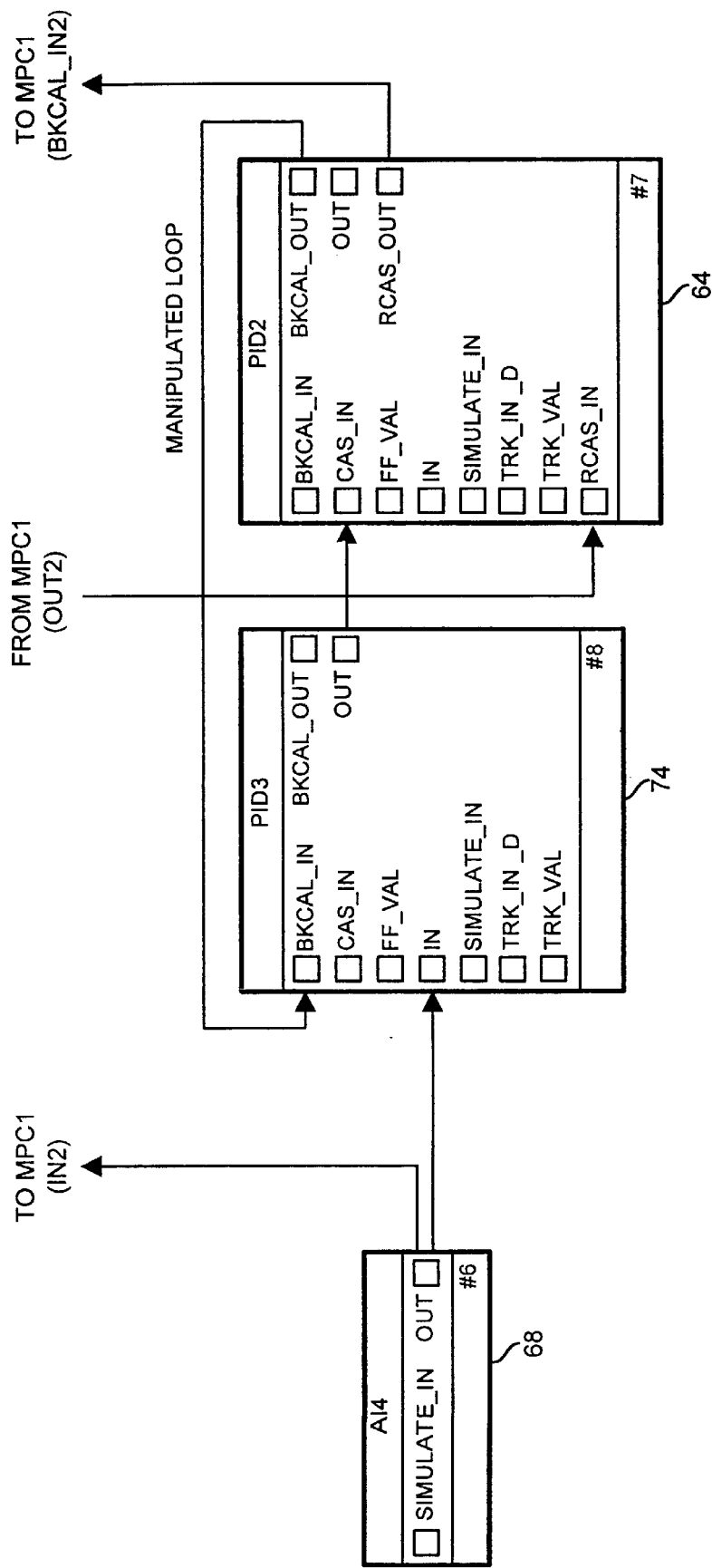

FIGS. 4A and 4B, for example, illustrates a Fieldbus-type MPC function block 60 connected to other Fieldbus-type function blocks within a process control system to coordinate existing multi-variable strategies implemented by single-loop control routines. In particular, the MPC function block 60 has a first output OUT1 connected to the RCAS_IN (remote cascade) input of an AO block 62 associated with a valve being manipulated and a second output OUT2 connected to the RCAS_IN (remote cascade) input of a PID function block 64. In addition, the MPC block 60 has a first input 11 (which is a controlled parameter input) delivered from an AI function block 66, a second input 12 (which is also a controlled parameter input) delivered from an AI function block 68 (FIG. 4B) and a third input (which is a disturbance parameter input) delivered from an AI function block 70. The AI function blocks 66, 68 and 70 may be associated with and provide signals measured by field devices, such as sensors, and transmitted to the control routine by a transmitter or other device. The MPC block 60 also receives feedback at inputs BKCAL_IN1 and BKCAL_IN2 (back calibration inputs) from the remote cascade outputs (RCAS_OUT) of AO function block 62 and the PID function block 64 for use in determining the effect of the control signals delivered by the MPC block 60 to the function blocks 62 and 64. The output of the AI function block 66 is also provided to an input of a PID function block 72 which provides a control signal to the cascade input (CAS_IN) of the AO function block 62 and receives a feedback signal from the output OUT of the AO function block 62 at the BKCAL_IN input of the PID function block 72 to thereby control the manipulated valve during regular operation of the process, i.e., without MPC operation. Likewise, the AO function block 68 delivers its output (which is a process output) to the auto input of a PID function block 74 which provides a control signal to the cascade input of the PID function block 64. The PID function block 74 also receives a feedback signal from the PID function block 64 at the BKCAL_IN input of the function block 74. The inputs and outputs of the function blocks in FIGS. 4A and 4B (as well as FIG. 5) are defined the same as in the Fieldbus protocol and operate in accordance with the definitions and constructs provided by the Fieldbus protocol.

As will be understood, the function blocks 66, 72 and 62 form a first single-loop control routine while the function blocks 68, 74 and 64 form a second single-loop control routine, both of which may be operated during regular or automatic operation of the process to provide single-loop control. However, the MPC block 60 may take over control of the AO function block 62 (and the associated device) as well as the control of the loop associated with the PID function block 64 by providing control inputs to the remote cascade inputs of the AO function block 62 and the PID function block 64, which will cause these function blocks to operate in the remote mode (instead of the automatic mode) and thus, operate using the control inputs at the remote inputs instead of at the auto inputs. When operating in the remote mode, the function blocks 62 and 64 ignore the inputs of the PID function blocks 72 and 74, respectively. In this manner, the MPC block 60 may be connected to and provide control of the blocks 62 and 64 but may be switched on and off. When not being controlled by the MPC function block 60, the blocks 62 and 64 are still controlled by the blocks 72 and 74 respectively, i.e., in accordance with a single-loop control strategy.

Figure 5:
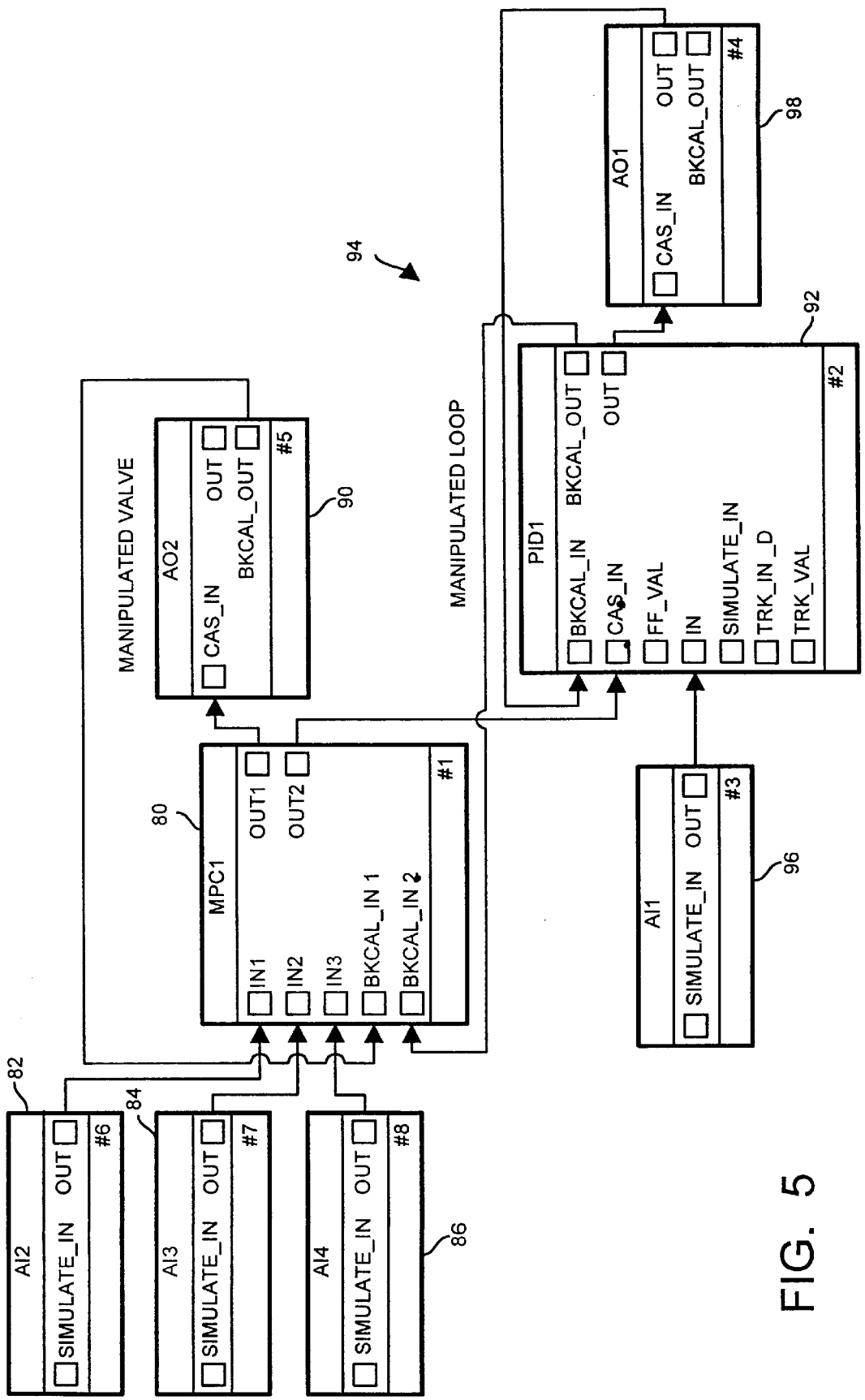
FIG. 5 is a block diagram of a model predictive control function block connected to function blocks within a process control routine to coordinate singleloop control routines.

Similarly, FIG. 5 illustrates an MPC function block 80 connected within a process control routine to coordinate single-loop routines. In particular, the MPC function block 80 receives controlled parameter inputs from AI function blocks 82, and 84 and a disturbance parameter input from an AI function block 86. The MPC function block 80 provides a control output to an AO function block 90 associated with a manipulated valve and provides a set point output to the cascade input (CAS_IN) of a PID function block 92 within a control loop 94. The AO function block 90 and the PID function block 92 provide back calibration outputs to the back calibration inputs of the MPC function block 80. The control loop 94 also includes an AI function block 96 which provides a control parameter input (i.e., a process output) to the auto input of the PID function block 92, which then provides a control output to an AO function block 98 associated with, for example, a different valve or device. The AO function block 98 provides a feedback to the back calibration input of the PID function block 92. In the configuration of FIG. 5, the MPC function block 80 controls the valve associated with the AO function block 90 directly and controls the operation of the loop 94 by manipulating the set point of that loop. However, the loop 94 continues to operate when the MPC function block 80 is operating. As such, the MPC function block 80 controls the device associated with the AO function block 98 indirectly but controls the control loop 94 directly. Of course, MPC blocks may be connected within a process control routine in any other desired manner to control devices or other control elements directly or indirectly. Still further, the control routines or modules may be developed using any technique, including graphical or non-graphical programming techniques.

Thus, as will be understood, the process inputs $X_1-X_3$ to which the outputs of the MPC control block 56 are connected in FIG. 3 may be any desired process inputs including inputs to control loops defined within an existing control strategy or inputs to valves or other devices connected to the process. Likewise, the process outputs $Y_1-Y_3$ connected to the inputs of the MPC block 56 may be any desired process outputs including outputs of valves or other sensors, outputs of AO or AI function blocks or outputs of other control elements or routines.

Referring again to the step 54 of FIG. 2, once the operator has created a control module including an initial MPC block having the inputs and outputs connected to desired process outputs and inputs, respectively, the control module having the initial MPC block therein is downloaded into the appropriate device, such as the controller 11 or one of the workstations 13, for execution. Next, at a step 99, the operator instructs the initial MPC block to begin to excite the process in known manners and to collect process input and output data while the process is being excited.

As illustrated in FIG. 3, the initial MPC block 56 includes a data collection routine 100, a waveform generator 101, generic control logic 102 and storage for storing control parameters 103 and a process model 104. The generic logic 102 may be, for example, a generic MPC routine that needs coefficients or other control parameters to be able to operate to perform control in a particular instance. In some cases, the generic logic 102 may also need a process model for the process being controlled to control that process. After being downloaded into, for example, the controller 11, the initial MPC block 56 is instructed, via the MPC creation routine 42, to begin the next phase of development of the MPC block 56 in which data is collected for each of the process outputs for use in creating a process model. In particular, when instructed to do so by the operator (or at any other desired time), the waveform generator 101 of the MPC block 56 begins to produce a series waveforms at the outputs $OUT_1$–$OUT_3$ thereof so as to provide excitation waveforms to each of the process inputs $X_1$–$X_3$. If desired, these waveforms may be provided to the generator 101 by software within the user workstation 13 but, are preferably created by the generator 101. The waveforms generated by the waveform generator 101 are preferably designed to cause the process to operate over the different ranges of inputs expected during normal operation of the process. To develop a process model for an MPC control routine, the waveform generator 101 may deliver to each of the process inputs $X_1$–$X_3$, a series of different sets of pulses, wherein the pulses within each of the sets of pulses have the same amplitude but have pseudo-random lengths and wherein the pulses within the different sets of pulses have different amplitudes. Such a series of set of pulses may be created for and then delivered to each of the different process inputs $X_1$–$X_3$ sequentially, one at a time. During this time, the data collection unit 100 within the MPC block 56 collects or otherwise coordinates the collection data indicating the response of the process outputs $Y_1$–$Y_3$ to each of the waveforms generated by the waveform generator 101 and may collect or coordinate the collection of data pertaining to the excitation waveform being generated. This data may be stored in the MPC block 56 but, preferably, is automatically sent to the data historian 12 for storage and/or to the workstation 13 where this data may be displayed on the display screen 14.

Thus, instead of trying to control the process 58 using some advanced control logic (which has not yet been completely developed), the MPC block 56 first provides a set of excitation waveforms to the process 58 and measures the response of the process 58 to these excitation waveforms. Of course, the excitation waveforms generated by the waveform generator 101 may be any desired waveforms developed to create a process model useful for the creation control logic parameters for any advanced control routine. In this example, the waveform generator 101 generates any set of waveforms that is known to be useful in developing a process model for a model predictive controller, and these waveforms may take any form now known or developed in the future for this purpose. Because waveforms used to excite a process for the purpose of collecting data to develop a process model for model predictive control are well known, these waveforms will not be described further herein. Likewise, any other or any desired types of waveforms may be generated by the waveform generator 101 for use in developing process models for other advanced control (which includes modeling) routines, such as neural networks, multi-variable fuzzy logic, etc. control routines.

It should be noted that the waveform generator 101 may take any desired form and may, for example, be implemented in hardware, software or a combination of both. If implemented in software, the waveform generator 101 may store an algorithm that can be used to generate the desired waveforms, may store digital representations of the waveforms to be generated, or may use any other routine or stored data to create such waveforms. If implemented in hardware, the waveform generator 101 may take the form of, for example, an oscillator or a square wave generator. If desired, the operator may be asked to input certain parameters needed to design the waveforms, such as the approximate response time of the process, the step size of the amplitude of the waveforms to be delivered to the process inputs, etc. The operator may be prompted for this information when the MPC block 56 is first created or when the operator instructs the MPC block 56 to begin to upset or excite the process and collect process data. In a preferred embodiment, the data collection unit 100 collects (or otherwise assures the collection of) data in response to each of the excitation waveforms for three or five times the response time input by the operator to assure that a complete and accurate process model may be developed. However, data may be collected for any other amount of time.

In any event, the MPC control block 56 preferably operates until the waveform generator 101 has completed delivering all of the necessary excitation waveforms to each of the process inputs $X_1$–$X_3$ and the data collection unit 100 has collected data for the process outputs $Y_1$–$Y_3$. Of course, the operation of the MPC block 56 may be interrupted if so desired or if necessary during this data collection process.

Figure 6:
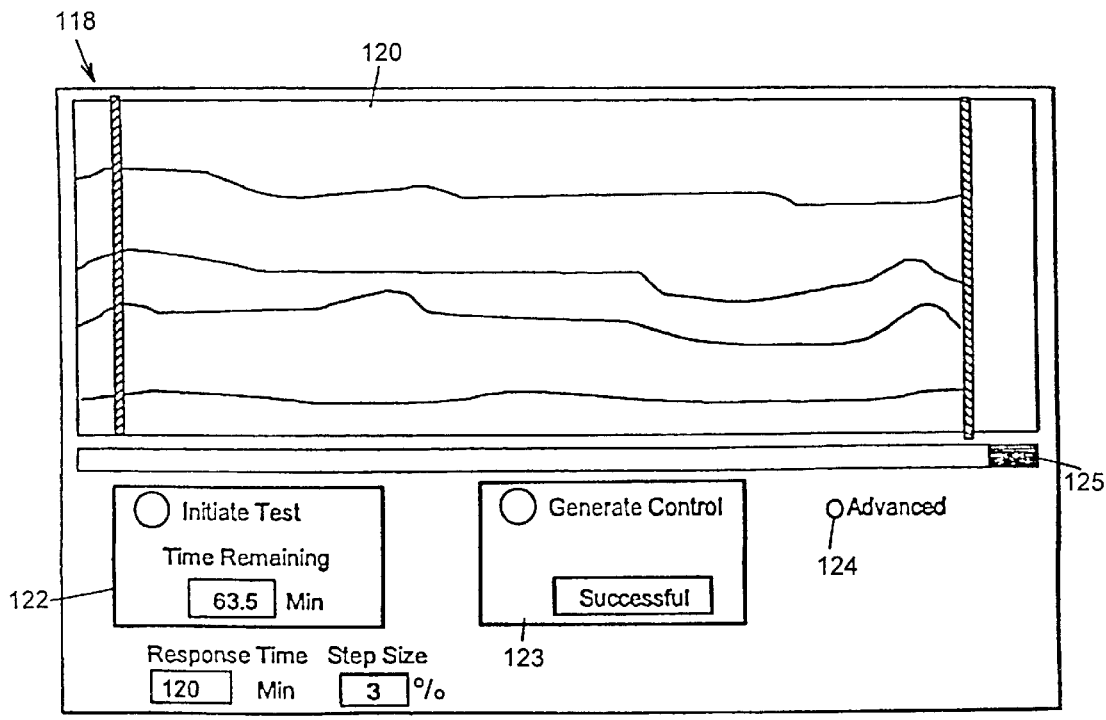
FIG. 6 is an example screen display generated by a process modeling tool used to develop an advanced control block.

Referring to FIG. 6, a screen display 118 which can be presented to the operator on one of the displays 14 by the control logic generation routine 40 enables an operator to implement the different steps of generating an advanced control block. In particular, the screen display 118 includes a data display area 120, and three buttons 122, 123 and 124 which may be used to initiate different parts of the advanced control block generation routine 40. The Initiate Test button 122 enables the operator to cause the initial MPC block 56 to send excitation signals to the process 58 and to collect input and output data for delivery to the data historian 12. The button 122 may illustrate, for example, the time remaining for performing the excitation routine, i.e, the time it will take the MPC control block 56 to generate all of the excitation waveforms and to collect the process data generated in response to these waveforms. Before pressing the button 122, the operator may input a response time indicating a typical time that it takes the process to respond to an input and may indicate or specify the step size which is used to used by the MPC block 56 to generate the excitation waveforms, which data may be provided to the waveform generator 101 of the MPC block 56. After pressing the button 122, the data collected by the MPC block 56 may also be displayed on the data display area 120 and, if desired, the user may flag data that should not be used to create a process model. It should be understood that the data collection unit 100 may collect data by assuring that this data is sent to the data historian 12 or other storage device for storage.

Next, as indicated in FIG. 2 at the step 125, the operator may, at some point decide to implement the next phase of developing the MPC block by executing the process modeling routine 44 which accesses the collected data from the data historian 12 and runs any known process model generation routine to create a process model from the collected data. Generally speaking, the operator may initiate this phase by selecting the Generate Control button 123 on the screen display of FIG. 6.

If desired, the process modeling routine 44 may run a data screening procedure on the collected data. This data screening procedure may check the collected data for outliers and other obviously erroneous data and may check other values associated with the collected data, such as status and limit values associated with the collected data, to determine if the data was generated by a function block having a bad or improper status, if the data was at a limit, if the data was generated when a function block or other element was in an improper mode, or if the data was, in some other way, generated under abnormal or undesirable process conditions. For example, in the Fieldbus communication protocol, data generated by function blocks also includes a status, a limit and a mode indication which can be stored with the data in the data historian 12 and used to screen the data. If desired, the data screening routine may illustrate the collected data to the operator on the data display area 120 of FIG. 6 and enable the operator to mark the data to be screened or eliminated, by for example, highlighting or otherwise identifying this data, based on the operator's knowledge of the process conditions. In this manner, data that was collected by the MPC block 56 when the process 58 was off-line, when the process 58 was not being controlled properly, when the process 58 was under repair, when a sensor or other device within the process 58 was faulty or being replaced, etc. may be selected and eliminated from the data to be used to create a process model.

As illustrated in FIG. 6, a trend in the display area 120 may be displayed containing the MPC inputs and outputs as a trend plot. The plot can be auto-scaled based on the values of the inputs and outputs. Also, the time frame of the portion of the plot that is displayed will, preferably, be two times the specified response time.

By using a slider bar 126, the time window may be changed to show values that go back to some previous time, such as the last two days. To enable good data to be collected on plant operation, an automated test feature may be used. By selecting the Initiate Test button 122, the process inputs that will be manipulated by the MPC block are bumped by the specified step size in a pseudo-random sequence over the specified response time. Also, when the Initiate Test button 122 is selected, start and end divider bars on the data display are automatically set to mark the start and end of the automated testing and the MPC block 56 overtakes control of the manipulated outputs by providing the pseudo-random sequence of output signals as excitation waveforms to the process 58.

The time bars or data window in the area 120 may also be used to select the data that is to be used to develop the process model. An operator may select one of the divider bars and drag it to the desired start or end time to change the time frame considered for process model identification. If part of the time between the start and end bar is not representative of normal plant operation, then the user or operator can lasso this section of time to select data values to be ignored during the process model identification process. In response, the selected area may be shown in a darker background color and will automatically be excluded when creating the process model.

After screening the data, the process modeling routine 44 creates a process model from the selected data. As noted above, the process modeling routine 44 may perform any desired or known type of process modeling analysis to develop a process model from the collected and screened data and the developed process model may take on any form, such as a mathematical algorithm, a series of response curves, etc.

If the process modeling routine 44 has a problem determining the process model, then an indication of the problem may be reflected in a status area of a user display, such as that of FIG. 6. One problem that may be indicated is that there are not enough samples to identify or create a process model. A message such as "For the defined configuration, a minimum number of XXX samples is required. Data file contains only XXX samples" may be generated to notify the operator of this problem. Another problem that may be detected is that not enough excitation occurred on the process inputs. A message to this effect and identifying the signal tag names, such as TagX, TagY, etc. and the minimum changes to the excitation amount can be provided to the operator is such a problem occurs.

If desired, and based on the conditions that prevented a successful model being identified, the user may change the time frame over which the process modeling is performed, or change process inputs so that the data used in process modeling routine 44 is valid. The process model that is identified may be automatically saved in any desired database to be accessible for later use. More experienced users may want to examine or edit the process model that was identified. By selecting the Advanced button 124 on the screen of FIG. 6, the user can be given a choice of generating an MPC controller from a selected model and the current MPC function block configuration or editing a specific model and saving the resulting model as a new model to be used to create MPC control logic. When the generate controller option is selected, the user may be presented with a dialog from which he or she may select a model that has been previously saved for the MPC block in the MPC module that is being edited. By selecting the edit option, the user can be presented with a list of the models that have been developed for the MPC module in question. After selecting a model, the user may be taken to a screen that displays an overview of the process step response and to other screens, as described hereinafter, to edit process step responses to create a new or altered module.

At some point in the process, the logic parameter creation routine 46 may be executed to create the parameters (to be stored in the variables within the MPC block 56) needed by the generic logic 102 of the initial MPC block 56 to perform model predictive control. These control parameters, which may be, for example, matrix or other MPC coefficients for MPC logic, tuning parameters, neural network parameters (for a neural network), scaling factors (for multi-variable fuzzy logic) or any other desired parameters, are usually determined based on the generated process model. The logic parameter creation routine 46 may perform any desired or known procedure for creating the parameters from a process model. Generally speaking, this process entails inverting the process model in a matrix format. However, any other desired logic parameter creation routine could be used. Because the specifics of creating a process model from collected data for a process and generating MPC or other control logic parameters from that process model is known in the art, these procedures will not described further herein. It should be noted, however, that the operator may have some input on the creation of the control logic parameters for the MPC block 56. In fact, the operator may be requested or otherwise be given the ability to specify the values of certain variables typically used to create an MPC controller. For example, the operator may specify the set points and limits of each of the constrained inputs to the MPC block, the time frame over which control changes are to be made, i.e., the set point trajectory filter and the time constants associated with this filter, the maximum or minimum movement (rate limit) of an MPC output or a process output, whether any of the controlled parameters respond in an integrated manner, MPC optimization factors, variables or tuning parameters, the horizon of the MPC control block, i.e., how many steps forward calculations are to be performed to control to a desired state, the engineering unit ranges for each of the inputs and outputs of the MPC block 56, which of the manipulated variable targets will be allowed to be relaxed or not realized when one of the constraints is violated, a description and/or name of each of the MPC block inputs and outputs, the value of any optimization variables that can be set, the value of variables related to the aggressiveness or robustness of the MPC block, etc. If desired, the control logic generation routine 46 may store default values for some or all of these variables or settings and use these default values to create the MPC logic. However, the operator or other user may be able to change these settings via the user display 14.

In any event, the MPC logic parameter creation routine 46 executes using this information and any other information that may be needed to create MPC (or other) control logic parameters, such as MPC coefficients. The Generate Control button 123 on the screen display 118 may indicate whether or not the creation of a process model and control logic parameters was successful.

After the MPC control logic parameters are created, at a step 128 of FIG. 2, the MPC control logic parameters or coefficients may be tested using a process simulation block. This simulation block may generally be developed from the process model created for the process and can be connected to an MPC block in a testing environment as will be described herein to test whether the created MPC control logic operates satisfactory over the range of normal operation of the process. If the MPC logic is not satisfactory, any or all of the steps 54, 99 and 125 may be repeated to develop different MPC control logic. However, if the MPC control logic is satisfactory, the MPC control logic parameters and the process model may be downloaded at a step 130 to the MPC block 56 to be stored in the parameter storage 103 and the process model storage 104 to be used to control the process 58. In this manner, the parameters needed by the MPC control logic are provided to and contained within the MPC block 56 and the MPC block 56 can be commissioned to operate or to actually perform control within the process according to the MPC control logic 102. Of course, if desired, the actual MPC logic 102 along with the parameters needed therefore can be created in the workstation 13 and downloaded to the MPC block 16.

Once downloaded and executed by the controller 11, the MPC module or loop having the MPC block 56 therein may perform reporting functions in the same manner as other blocks or elements within the control routine because, as noted above, the MPC block 56 and the control module including this block are designed using the same programming paradigm as the other control blocks within the process control system 10. In one embodiment, the MPC block or module may have graphical views associated therewith that can be displayed to a user or operator via, for example, one of the display screens 14 of one or more of the workstations 13, these views subscribing to data associated with the blocks within the MPC control module and displaying this data in a predefined or specified manner.

Figure 7:
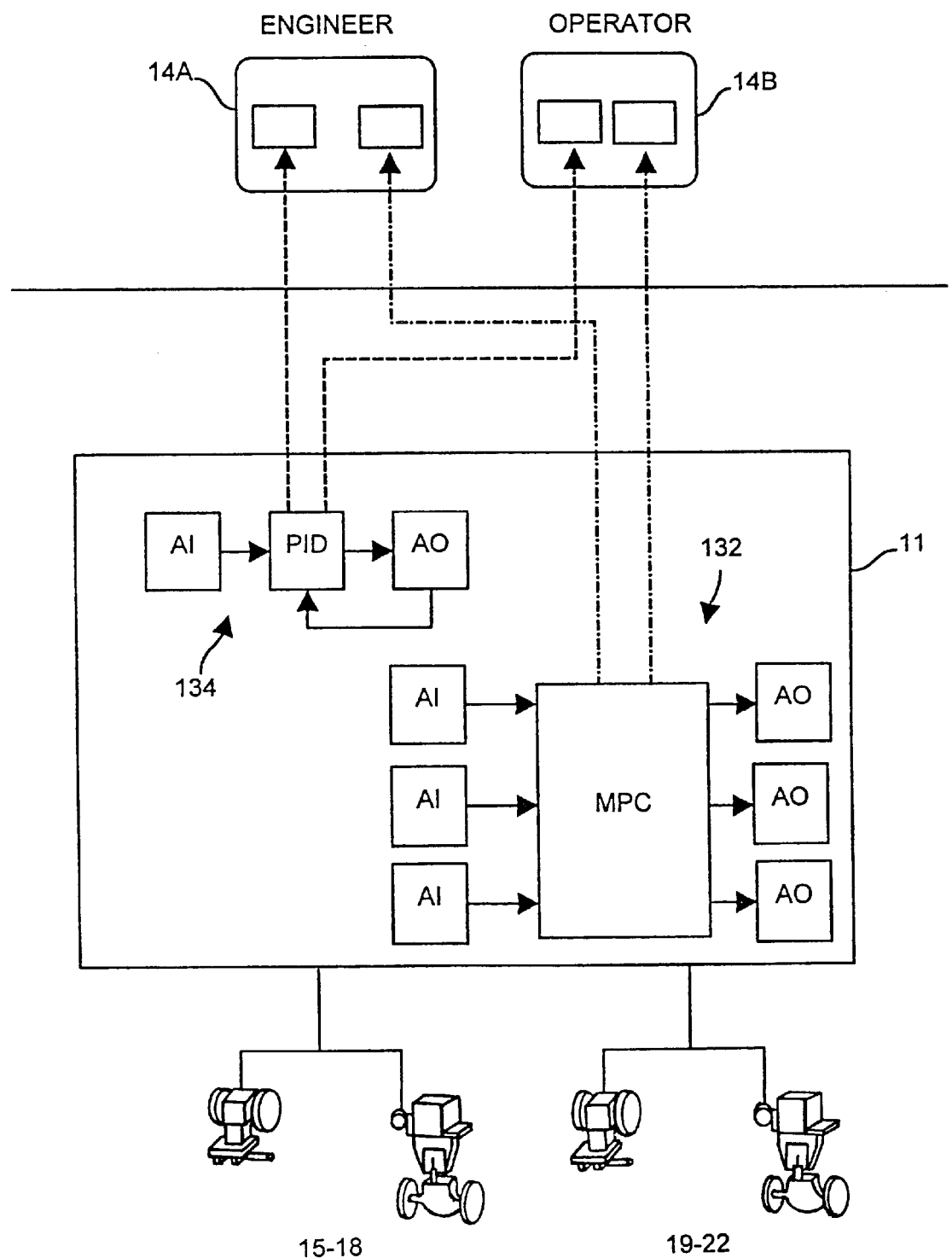
FIG. 7 is a block/schematic diagram of portions of the process control system of FIG. 1, illustrating the use of graphical views associated with an advanced control block.

Referring to FIG. 7, for example, portions of the process control system 10 of FIG. 1 are illustrated, including the controller 11 coupled via a communication link (not specifically shown) to the user displays 14A and 14B and to the devices 15–22. Within the controller 11, an MPC module 132 is illustrated as having an MPC function block receiving inputs from a set of AI function blocks and providing outputs to a set of AO function blocks, respectively while a single-loop control routine 134 is illustrated as including a PID block receiving an input from an AI function block to control an AO function block.

Different views of the operation of these two control modules, such as an operator's view and an engineer's view are graphically depicted on the display screens 14A and 14B. In particular, an engineer's view on the display 14A includes a graphical depiction of the operation of the loop 132 as well as a graphical depiction of the loop 134 created to enable an engineer to access information pertaining to these loops and to manipulate these loops. Similarly, an operator's view having a graphical depiction of the operation of the loop 132 as well as a graphical depiction of the loop 134 is provided on the display 14B to enable an operator to access information pertaining to these loops and to manipulate these loops. However, the information provided in the operator's view may be different than the information in the engineer's view, and the capabilities provided by these views to interact with the loops 132 and 134 may be different. For example, the operator's views may only enable the operator to change set points and perform limited functions, while the engineer's view may enable the user to make changes to the set up of a loop, make changes to the programming within function blocks, etc. These different views may be created in conjunction with function blocks in a manner similar to that disclosed with respect to the templates discussed in U.S. Pat. No. 5,594,858 to Blevins, entitled "Uniform Control Template Generating System and Method for Process Control Programming," which is hereby expressly incorporated by reference herein. It will be understood, however, that the MPC blocks and modules created using these blocks can provide the same kinds of graphical or reporting support as other blocks, routines or elements within the process control system 10 because the MPC block has been created on-line using the same programming strategy as the other control blocks. This feature eliminates the necessity to provide special programming simply to enable an operator, technician, engineer, etc. to view what is happening within the MPC control module or block.

If desired, the MPC module 132 may report any desired information to a user via a predefined view or display and enable the user or operator to take any desired action. For example, the user may be provided a screen that illustrates alarms generated by or associated with the MPC module 132, that provides a plot of the controlled, constrained and disturbance parameters (which may also show future projected values of the controlled and constrained parameters), that allows a user or operator to control execution of the MPC module 132 using, for example, the mode parameter (when the MPC module 132 is a developed using, for example, a Fieldbus protocol), that illustrates numerically or by a bar graph the values of set points, constraints and controlled or constrained inputs and outputs, that enables the MPC set points or targets to be changed, that indicates the status of MPC inputs to, for example, show whether the inputs are bad, uncertain or limited, or that illustrates any other desired data or that performs any other desired function.

In addition to downloading the MPC control logic to the MPC block within an MPC control module, at a step 135 of FIG. 2, the MPC logic or an MPC block having the developed logic therein may be sent to a workstation to use in one or more simulation environments to, for example, train users how to use an MPC control block, to test the MPC block, etc. Such a simulation environment may be provided using the system described in detail in U.S. Provisional Patent Application No. 60/132,780 entitled "Integrating Distributed Process Control System Functionality on a Single Computer," filed May 6, 1999, which is assigned to the assignee of the present invention and the disclosure of which is hereby expressly incorporated by reference herein.

Figure 8:
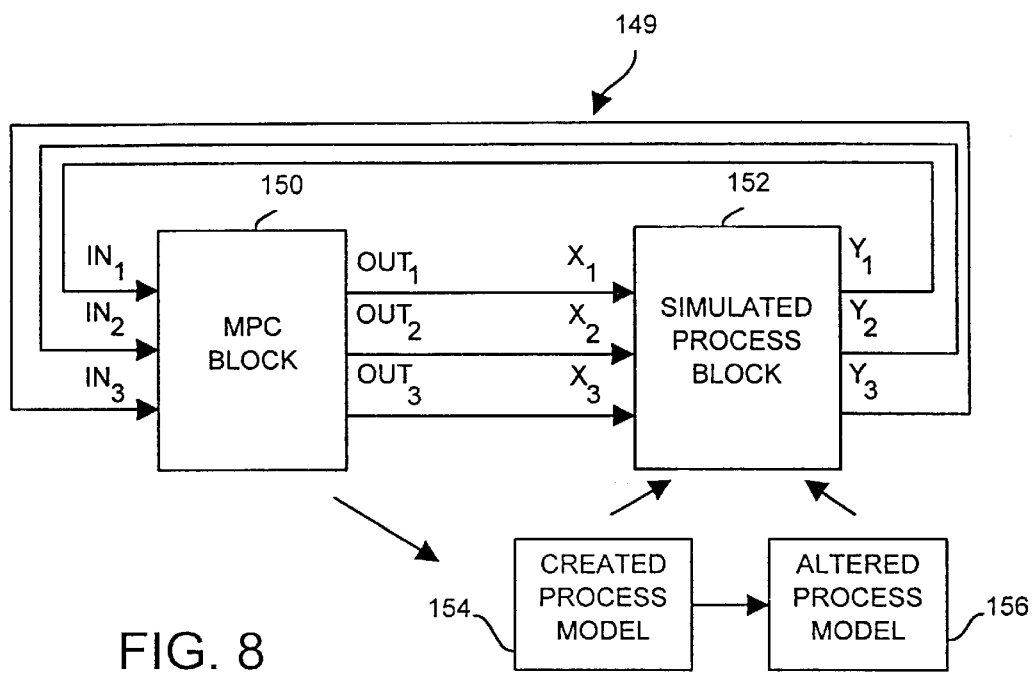
FIG. 8 is a block diagram of a model predictive control block connected to a process simulation block.

Referring to FIG. 8, a simulation configuration 149 includes an MPC block 150 which has been created and connected to a process simulation block 152 in a simulation environment. The simulation configuration 149 may be used in the step 128 of FIG. 2 to, for example, test a completed MPC block to determine if it adequately controls the process for which it has been developed or may be used at the step 135 of FIG. 2 to, for example, provide a training or other testing environment using MPC blocks. The MPC block 150 of FIG. 8, which is illustrated as having three inputs $IN_1$–$IN_3$ and three outputs $OUT_1$–$OUT_3$, is connected to the simulation block 152 having three inputs $X_1$–$X_3$ and three outputs $Y_1$–$Y_3$, wherein the outputs $Y_1$–$Y_3$ are connected to the inputs $IN_1$–$IN_3$, respectively, of the MPC block 150. The simulation block 152 may simulate the process for which the MPC function block 150 was created using the process model created at the step 125 of FIG. 2, as illustrated by the block 154 of FIG. 8. In this case, the process model created at the step 125 of FIG. 2 may be stored in the simulation block 152 and used to simulate the response of the process based on that process model and on the inputs received from the MPC block 150. Alternatively, the simulation block 152 may be created from a process model that is altered with respect to the process model generated in the step 125, as illustrated by the block 156 of FIG. 8. In this case, the process model created at the step 125 may altered in order to simulate, for example, changes to the process caused by, for example, physical alterations made to the process, aging of the equipment within the process, etc. If desired, the process model created at the block 125 of FIG. 2 may be altered in different ways to test the operation of the MPC block 150 when this block is used to control a process that is mismatched from the process used to create the MPC block 150 in the first place. Thus, if desired, the altered process model provided by the block 156 may be used within the simulation block 152 to determine the range of control that an MPC block provides when the process changes is mismatched to the MPC control logic, which enables a user to design MPC locks which operate over longer periods of time or which are better for controlling processes in the presence of process changes.

Figure 9:
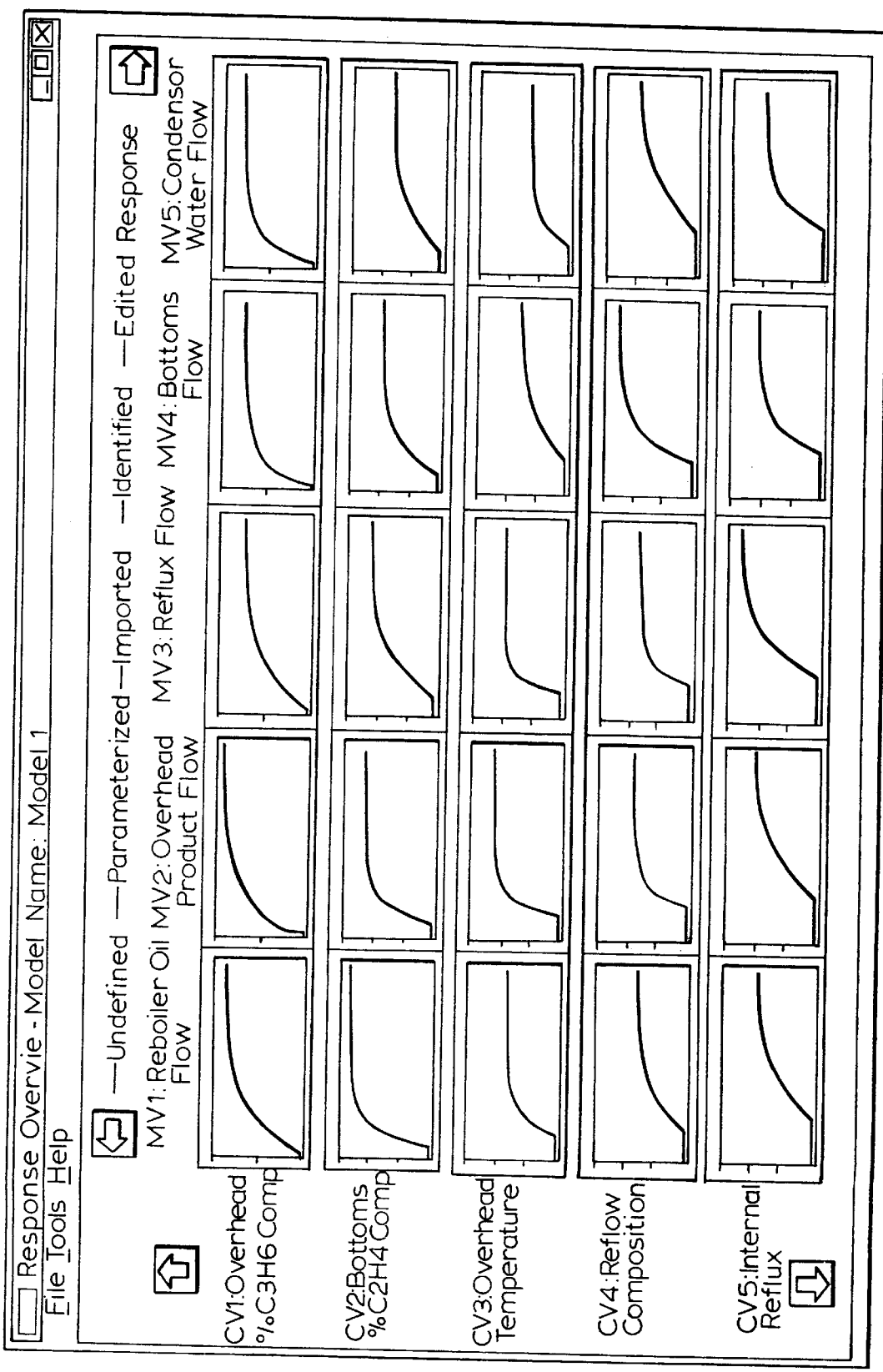
FIG. 9 is an example screen display generated by a process modeling tool used to develop an advanced control block or to develop a process simulation block.
Figure 10:
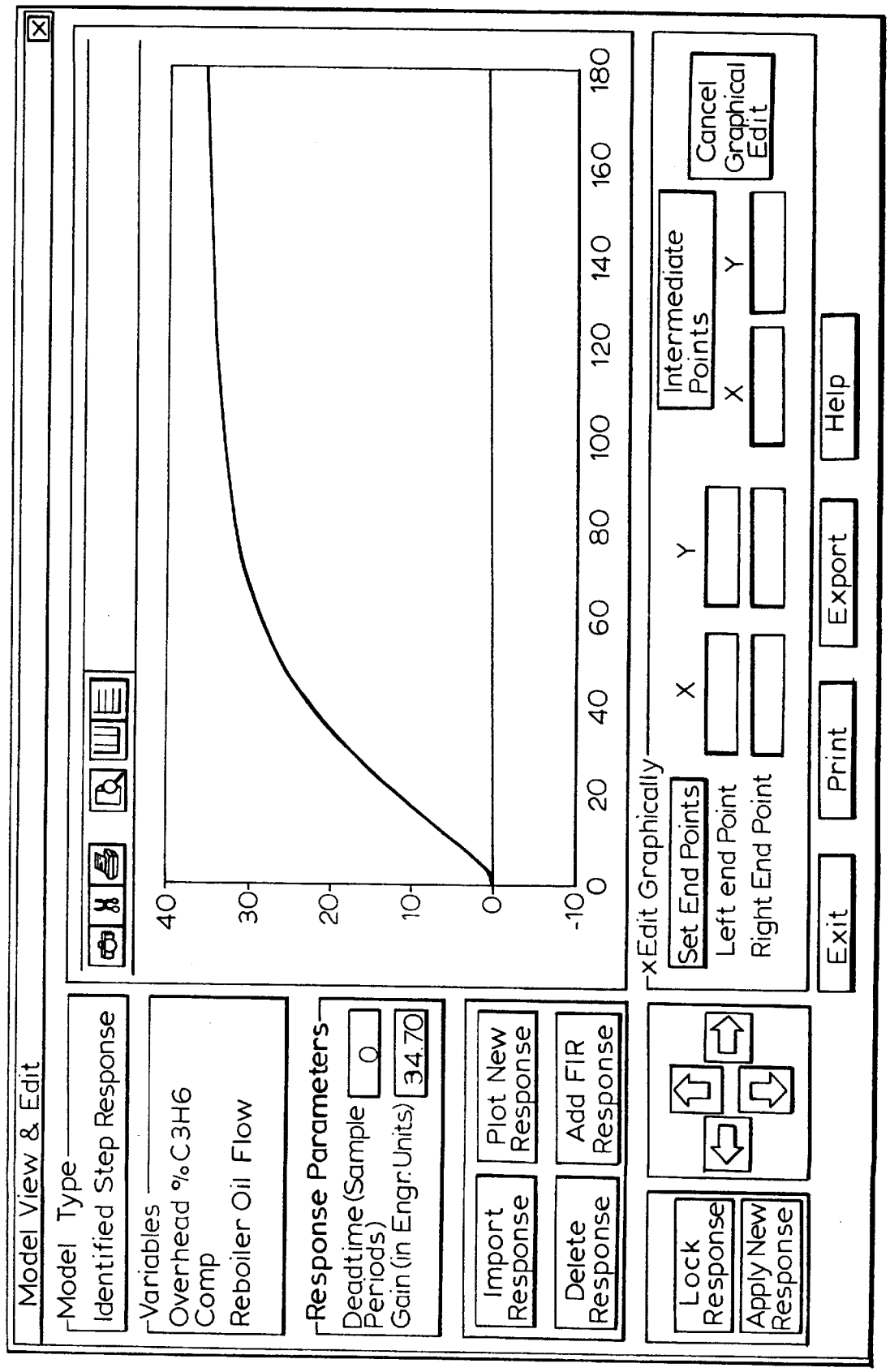
FIG. 10 is an example screen display generated by a process modeling tool used to develop an advanced control block or to develop a process simulation block.

To produce an altered process, the user or operator execute a routine to view the process model created at the step 125 or the set of process input/output response curves associated therewith, such as those illustrated in the screen of FIG. 9 for a 5×5 MPC block, and select one or more of these response curves to be changed. The selected response curve (illustrated as Overhead %C3H6 vs Reboiler Oil Flow) may then be displayed and manipulated via a further screen, such as the one illustrated in FIG. 10. As illustrated in FIG. 10, the user or operator may import or delete a response curve, add an FIR response, change response parameters, such as deadtime and gain, select new beginning or ending points, change the value of any of the points in the curve, provide different slopes to the curves, scale the curves, etc. in order to create altered response curves and, therefore, an altered process model. Of course, the user or operator may alter or change the process model in any other manner. The user may create or edit a process model 150, may create a process simulation block or element 152 from such a model, communicatively connect the process simulation block 152 to the MPC block 150 and run the connected loop using a routine such as the routine 153 illustrated in FIG. 1 in left hand processor 13 or in any other desired simulation environment or in the process environment.

Figure 11:
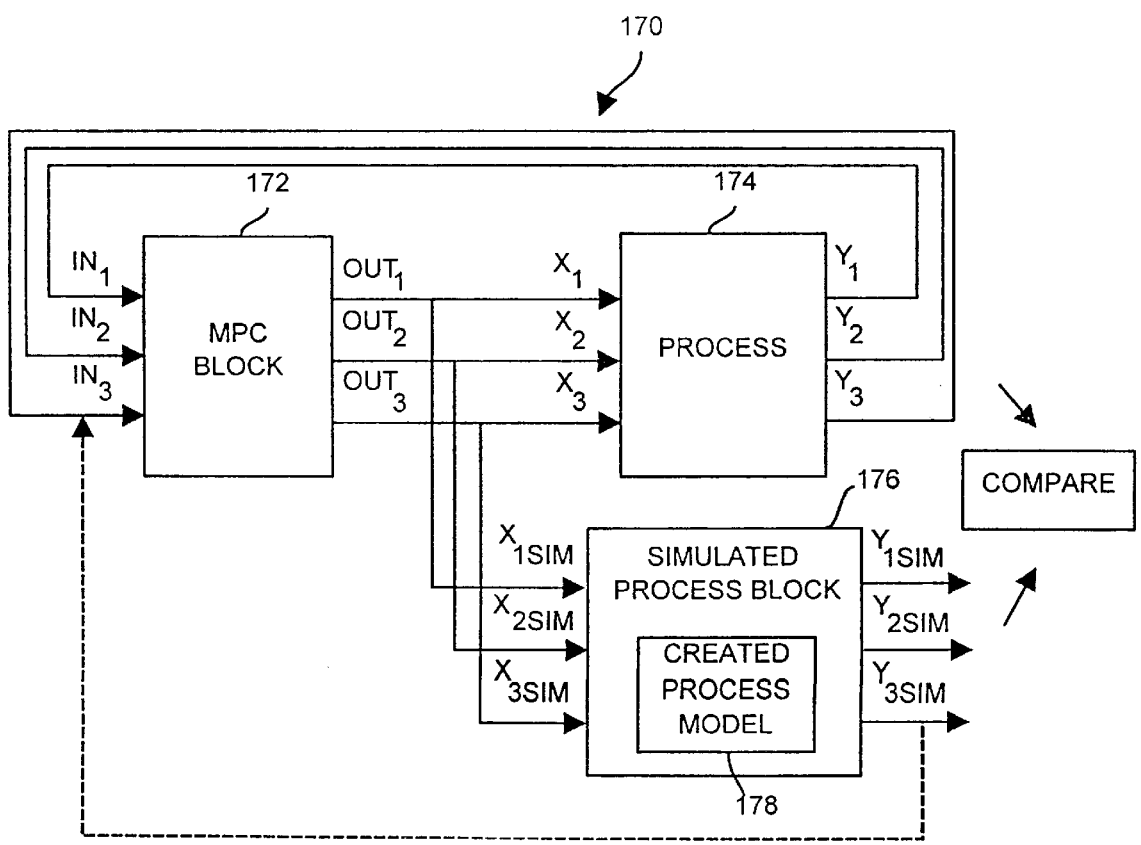
FIG. 11 is a block diagram of a model predictive control block connected to both a process and a process simulation block which simulates the operation of the process to produce virtual process outputs.

Referring now to FIG. 11, a further control loop 170 is illustrated as having an MPC block 172 connected to an actual process 174. In this case, the three outputs $OUT_1$–$OUT_3$ of the MPC block 172 are connected to the three process inputs $X_1$–$X_3$ of the process 174 as well as to three inputs $X_{1SIM}$–$X_{3SIM}$ of a simulated process block 176 that is based on a process model 178 created for the process 174. In this configuration, the MPC block 172 controls both the process 174 during runtime and also controls the simulated process block 176 which may be executed in, for example, one of the workstations 13 of FIG. 1 or in any other controller or device, and which produces simulated outputs $Y_{1SIM}$–$Y_{3SIM}$. In such a system, the outputs $Y_{1SIM}$–$Y_{3SIM}$ of the simulated process block 176 and the outputs $Y_1$–$Y_3$ of the actual process 174 may be compared to determine if the process outputs $Y_1$–$Y_3$ are significantly different than the simulated outputs $Y_{1SIM}$–$Y_{3SIM}$ and therefore, if there is a mismatch between the actual process 174 and the process model 178 from which the MPC block 172 was created. If so, it may be necessary to create another MPC block 172 or regenerate the logic parameters or model used by the MPC block 172 in controlling the process 174.

Also, if for some reason one of the outputs $Y_1$–$Y_3$ of the process 174 is erroneous due to, for example, a malfunction of the sensor measuring this output, the corresponding simulated output from the simulated process block 176 may be provided to the appropriate input of the MPC block 172, as illustrated by the dotted line in FIG. 11, to enable the MPC block 172 to provide better control of the actual process 174 until the faulty sensor or device is replaced or repaired. In this manner, a virtual process output may be developed for each of the actual process outputs by the simulated process block 176 and one or more of these virtual outputs may be used as an input to the MPC block 172 when the corresponding actual process output is faulty or cannot otherwise be used. For example, if a sensor measuring one of the process outputs $Y_1$–$Y_3$ malfunctions in the middle of the night, the user or operator may simply connect the corresponding virtual output to the appropriate input of the MPC block 172 so that the MPC block 172 can provide adequate control of the process 174 until the next day when a repair person can change or fix the faulty sensor. It will be understood that the simulated process block 176 can be run at all times that the actual process 174 is running and be provided with all the same inputs so that the simulated process block 176 can produce realistic virtual outputs. Of course, other simulation scenarios can be implements and can use a process model created in conjunction with the creation of the MPC block 150 or 172 or can use a process models produced as a variation of the process model created in conjunction with the creation of the MPC block 150 or 172.

Creating an MPC control block without the necessary control logic parameters and process model therefore and connecting this block within the process control system in a manner that is similar to the way in which other control blocks or elements are connected within the system, running the MPC control block to collect process data, producing a process model from the process data, creating logic parameters for the MPC block from the process model and loading the logic parameters and, if necessary, the process model into the MPC control block enables a user to create an MPC control block or module within a process control routine without having to go off-line, without having to have a lot of knowledge about how the MPC control routine must be created, without having to perform a lot of engineering to create waveforms to generate a process model and without having to reprogram a control routine to implement model predictive or other advanced control. As a result, this method saves time, costs and provides use of the created process model for other purposes, such as for simulation and the production of virtual process outputs within the process control environment.

As will be understood, the MPC or advanced control logic generation routines and methods described herein enable a user to create advanced control blocks such as MPC control blocks, neural network modeling or control blocks, etc. without having a great deal of expert knowledge about how those blocks are created and enables an operator to create and use an advanced control block without performing a lot of reprogramming of the process to implement advanced control. Also, because the advanced control block is created using the same programming paradigm as the other control elements within the system, the user can be provided consistent views of the process or graphical displays of the process having the advanced control block therein. Still further, because the process model is needed to be created for, for example, an MPC function block, this process model can be used to produce simulation function blocks which can be used to simulate the process for other purposes such as testing, training, detecting process/process-model mismatch or producing virtual outputs of the process for use in controlling a process.

While the advanced control blocks, the process simulation blocks and the associated generation and testing routines have been described herein as being used in conjunction with Fieldbus and standard 4–20 ma devices, they can, of course, be implemented using any other process control communication protocol or programming environment and may be used with any other types of devices, function blocks or controllers. Moreover, it is noted that the use of the expression "function block" herein is not limited to what the Fieldbus protocol or the DeltaV controller protocol identifies as a function block but, instead, includes any other type of block, program, hardware, firmware, etc., associated with any type of control system and/or communication protocol that can be used to implement some process control function. Also, while function blocks typically take the form of objects within an object oriented programming environment, this need not be case.

Although the advanced control blocks, the process simulation blocks and the associated generation and testing routines described herein are preferably implemented in software, they may be implemented in hardware, firmware, etc., and may be executed by any other processor associated with a process control system. Thus, the routine 40 described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control element adapted to be used as a portion of a process control routine implemented on a processor to control a process, the process control element comprising:

a computer readable medium;

an advanced control function block stored on the computer readable medium and adapted to be executed on the processor to implement multiple-input/multiple output control of a process, the advanced control function block including, a first plurality of inputs, wherein each input is adapted to receive a different one of a set of process parameters;

a second plurality of outputs, wherein each output is adapted to be communicatively coupled to a different process input for controlling the set of process parameters; and control logic responsive to the first plurality of inputs to produce a control signal at each of the second plurality of outputs.

2. The process control element of claim 1, wherein the advanced control function block includes parameter storage adapted to accept control parameters used by the control logic.

3. The process control element of claim 2, wherein the parameter storage is adapted to receive model predictive control logic coefficients.

4. The process control element of claim 2, wherein the advanced control function block includes a process model for the process that is used by the control logic to produce the control signals at the second plurality of outputs.

5. The process control element of claim 1, wherein the control logic is model predictive control logic.

6. The process control element of claim 1, wherein the control logic is neural network logic.

7. The process control element of claim 1, wherein the control logic is developed from a process model.

8. The process control element of claim 1, wherein the control logic includes a process model for the process.

9. The process control element of claim 1, wherein the advanced control function block is a Fieldbus function block corresponding to the Fieldbus protocol.

10. The process control element of claim 1, wherein the advanced control function block further includes a waveform generator adapted to generate process excitation waveforms at each of the plurality of outputs.

11. The process control element of claim 10, wherein the advanced control function block further includes a data collection unit adapted to coordinate the collection of data representing signal values at each of the plurality of inputs when the waveform generator generates the process excitation waveforms at each of the plurality of outputs.

12. The process control element of claim 10, wherein the waveform generator generates a series of pulses of pseudo-random length as the excitation waveforms.

13. The process control element of claim 10, wherein the waveform generator generates excitation waveforms adapted to develop a process model for the process for use in producing a model predictive controller.

14. The process control element of claim 1, wherein the advanced control function block includes a graphical view adapted to display information pertaining to operation of the advanced control function block via a user interface.

15. The process control element of claim 1, further including a process simulation function block communicatively coupled to the advanced control function block.

16. The process control element of claim 15, wherein the process simulation function block includes a process model that simulates the operation of the process.

17. A process control element adapted to be used as a portion of a process control routine implemented on a processor to control a process, the process control element comprising:

a computer readable medium;

an advanced control function block stored on the computer readable medium and adapted to be executed on the processor including, a first plurality of inputs, wherein each input is adapted to receive a different one of a set of process parameters;

a second plurality of outputs, wherein each output is adapted to be communicatively coupled to a different process input for controlling the set of process parameters;

a waveform generator adapted to generate process excitation waveforms at each of the plurality of outputs; and a data collection unit adapted to coordinate the collection of data representing signal values at each of the plurality of inputs when the waveform generator generates the process excitation waveforms at each of the plurality of outputs.

18. The process control element of claim 17, wherein the waveform generator generates a series of pulses of pseudo-random length as the excitation waveforms.

19. The process control element of claim 17, wherein the waveform generator generates excitation waveforms adapted to excite the process to develop a process model for use in producing a model predictive controller.

20. The process control element of claim 17, wherein the advanced control function block includes a graphical view adapted to display information pertaining to operation of the advanced control function block via a user interface.

21. The process control element of claim 17, wherein the advanced control function block includes control logic responsive to the first plurality of inputs to produce a control signal at each of the second plurality of outputs and includes parameter storage adapted to accept control parameters used by the control logic.

22. The process control element of claim 21, wherein the parameter storage is adapted to receive model predictive control logic coefficients.

23. The process control element of claim 20, wherein the advanced control function block includes a process model storage adapted to store a process model for the process, and wherein the control logic is adapted to use the control parameters stored in the parameter storage and the process model stored in the process model storage to produce the control signals at the second plurality of outputs.

24. A method of developing an advanced control element for use in a process control routine that controls a process, the method comprising the steps of:

providing an advanced control element having a first plurality of control inputs adapted to receive process outputs of the process and having a second plurality of control outputs adapted to provide control signals to process inputs of the process;

communicatively connecting the advanced control element within the process control routine;

using the advanced control element to provide excitation waveforms to each of the process inputs;

using the advanced control element to collect data reflecting the response of each of the process outputs to the excitation waveforms;

creating a process model from the collected data;

developing advanced control logic parameters from the process model; and placing the advanced control logic parameters within the advanced control element for use by the advanced control element to control the process.

25. The method of developing the advanced control element of claim 24, wherein the step of providing the advanced control element includes the step of providing the advanced control element as a function block.

26. The method of developing the advanced control element of claim 25, wherein the step of communicatively connecting the advanced control element within the process control routine includes the steps of communicatively connecting one of the control inputs to a first function block and of communicatively connecting one of the control outputs to a second function block.

27. The method of developing the advanced control element of claim 26, wherein the step of communicatively connecting one of the control outputs to the second function block includes the step of communicatively connecting the one of the control outputs to a control function block to provide control of a control loop within the process control routine.

28. The method of developing the advanced control element of claim 26, wherein the step of communicatively connecting the one of the control outputs to the second function block includes the step of communicatively connecting the one of the control outputs to an output function block associated with a device to provide control of the device.

29. The method of developing the advanced control element of claim 24, wherein the step of providing the advanced control element includes the step of providing the advanced control element as a Fieldbus function block.

30. The method of developing the advanced control element of claim 24, wherein the step of developing the advanced control logic parameters includes the step of developing model predictive control coefficients.

31. The method of developing the advanced control element of claim 24, wherein the step of developing the advanced control logic parameters includes the step of developing neural network logic parameters.

32. The method of developing the advanced control element of claim 24, wherein the step of using the advanced control element to provide excitation waveforms to each of the process inputs includes the step of generating a series of pulses of pseudo-random length as the excitation waveforms.

33. The method of developing the advanced control element of claim 24, wherein the step of using the advanced control element to provide excitation waveforms to each of the process inputs includes the step of generating a series of excitation waveforms adapted to develop a process model for the process for use in producing a model predictive controller.

34. The method of developing the advanced control element of claim 24, wherein the step of creating a process model from the collected data includes the step of generating a set of response curves from the collected data as the process model.

35. The method of developing the advanced control element of claim 34, wherein the step of creating a process model from the collected data includes the step of altering one or more of the set of response curves generated from the collected data to produce an altered set of response curves and using the altered set of response curves as the process model.

36. The method of developing the advanced control element of claim 24, further including the step of using the advanced control element in a simulation environment.

37. The method of developing the advanced control element of claim 36, wherein the step of using the advanced control element in a simulation environment includes the step of connecting the advanced control element to a simulated process element.

38. The method of developing the advanced control element of claim 37, wherein the step of using the advanced control element includes the step of developing the simulated process element from the process model.

39. The method of developing the advanced control element of claim 37, wherein the step of using the advanced control element includes the steps of altering the process model and developing the simulated process element from the altered process model.

40. The method of developing the advanced control element of claim 24, wherein the step of providing an advanced control element includes the step of placing control logic in the advanced control element prior to the step of communicatively connecting the advanced control element within the process control routine.

41. The method of developing the advanced control element of claim 24, further including the step of providing the process model to the advanced control block for use in controlling the process.

42. The method of developing the advanced control element of claim 24, wherein the step of creating the process model from the collected data includes the step of screening the collected data and creating the process model from the screened data.

43. An advanced control element development system adapted to develop an advanced control element for use in a process control routine that is executed within a process control system, the advanced control element development system including:
    a computer readable medium;
    a first routine stored on the computer readable medium and adapted to be executed on a processor that creates an advanced control element having a first plurality of control inputs adapted to receive process outputs and having a second plurality of control outputs adapted to provide control signals to process inputs;
    a second routine stored on the computer readable medium and adapted to be executed on a processor that enables a user to communicatively connect the advanced control element within the process control routine;
    a third routine stored on the computer readable medium and adapted to be executed on a processor that uses the advanced control element to provide excitation waveforms to each of the process inputs;
    a fourth routine stored on the computer readable medium and adapted to be executed on a processor that uses the advanced control element to collect data reflecting the response of each of the process outputs to the excitation waveforms;
    a fifth routine stored on the computer readable-medium and adapted to be executed on a processor that creates a process model from the collected data;
    a sixth routine stored on the computer readable medium and adapted to be executed on a processor that develops advanced control logic parameters from the process model; and
    a seventh routine stored on the computer readable medium and adapted to be executed on a processor that places the advanced control logic parameters within the advanced control element to enable the advanced control logic element to control the process.

44. The advanced control element development system of claim 43, wherein the first routine creates the advanced control element as a function block.

45. The advanced control element development system of claim 44, wherein the second routine enables a user to connect the advanced control element within the process control routine by connecting one of the control inputs to a first function block and by connecting one of the control outputs to a second function block.

46. The advanced control element development system of claim 43, wherein the first routine creates the advanced control element as a Fieldbus function block that uses the Fieldbus protocol.

47. The advanced control element development system of claim 43, wherein the sixth routine develops the advanced control logic parameters as model predictive control coefficients.

48. The advanced control element development system of claim 43, wherein the sixth routine develops the advanced control logic parameters as neural network logic parameters.

49. The advanced control element development system of claim 43, wherein the third routine causes the advanced control element to generate excitation waveforms at each of the control outputs for delivery to each of the process inputs.

50. The advanced control element development system of claim 43, wherein the seventh routine places the process model in the advanced control element.

51. The advanced control element development system of claim 43, further including an eighth routine stored on the computer readable medium and adapted to be executed on a processor that produces a process simulation element from the process model.

52. The advanced control element development system of claim 43, wherein the fifth routine includes another routine that enables screening of the collected data to produce a set of screened data and wherein the fifth routine creates the process model from the screened data.

53. A method of using a multiple-input/multiple output advanced control element capable of controlling a process, wherein the advanced control element was is based on a process model developed for the process, the method comprising the steps of:
    generating a process simulation element from the process model;
    communicatively connecting the process simulation element to the advanced control element; and
    using the advanced control element to control the process simulation element.

54. The method of using the multiple-input/multiple output advanced control element of claim 53, further including the step of testing the advanced control element as connected to the process simulation element before using the advanced control element to control the process.

55. The method of using the multiple-input/multiple output advanced control element of claim 53, further including the step of using the advanced control element and the process simulation element in a training environment.

56. The method of using the multiple-input/multiple output advanced control element of claim 53, wherein the step of generating a process simulation element includes the steps of altering the process model and using the altered process model to generate the process simulation element.

57. The method of using the multiple-input/multiple output advanced control element of claim 56, further including the step of testing the advanced control element as connected to the process simulation element to determine the operation of the advanced control element in the presence of process/process-model mismatch.

58. The method of using the multiple-input/multiple output advanced control element of claim 53, including the steps of connecting the advanced control element to the process and using the advanced control element to control the process while the advanced control element controls the process simulation element.

59. The method of using the multiple-input/multiple output advanced control element of claim 58, further including the step of comparing process outputs of the process to outputs of the process simulation element to measure process/process-model mismatch.

60. The method of using the multiple-input/multiple output advanced control element of claim 58, further including the step of providing an output of the process simulation element to an input of the advanced control element for use in controlling the process.

* * * * *

UNITED STATES PATENT AND TRADEMARK OFFICE
CERTIFICATE OF CORRECTION

PATENT NO. : 6,445,963 B1 Page 1 of 1
DATED : September 3, 2002
INVENTOR(S) : Terrence Blevins et al.

It is certified that error appears in the above-identified patent and that said Letters Patent is hereby corrected as shown below:

Column 1,
Line 24, please delete "process,such" and insert -- process, such --.

Column 4,
Line 15, please delete "multipleinput" and insert -- multiple-input --.

Column 7,
Line 66, please delete "36." and insert -- 36 --.

Column 8,
Line 45, please delete "and." and insert -- and --.

Column 9,
Line 60, please delete "ohutputs" and insert -- outputs --.

Column 11,
Line 13, please delete "11" and insert -- I1 --.
Line 14, please delete "12" and insert -- I2 --.

Column 17,
Line 33, please delete "therefore" and insert -- therefor --.

Column 20,
Line 46, please delete "therefore" and insert -- therefor --.

Column 26,
Line 38, please delete "was".

Signed and Sealed this

Eighth Day of June, 2004

JON W. DUDAS
*Acting Director of the United States Patent and Trademark Office*